United States Patent [19]
Barrett

[11] Patent Number: 5,311,451
[45] Date of Patent: May 10, 1994

[54] RECONFIGURABLE CONTROLLER FOR MONITORING AND CONTROLLING ENVIRONMENTAL CONDITIONS

[75] Inventor: Michael R. Barrett, Barrington, Ill.

[73] Assignee: M. T. McBrian Company, Inc., Barrington, Ill.

[21] Appl. No.: 803,793

[22] Filed: Dec. 6, 1991

Related U.S. Application Data

[60] Continuation of Ser. No. 546,000, Jun. 28, 1990, abandoned, which is a division of Ser. No. 359,995, May 31, 1989, Pat. No. 5,103,391, which is a continuation-in-part of Ser. No. 105,804, Jan. 6, 1987, abandoned.

[51] Int. Cl.$^5$ .................. G06F 15/46; G06F 15/20
[52] U.S. Cl. .................. 364/550; 165/12; 236/49.3; 364/148; 364/505; 364/557
[58] Field of Search .......... 364/550, 557, 505, 506, 364/148, 130, 133; 165/12; 237/1 B, 1 C, 49.3

[56] References Cited

U.S. PATENT DOCUMENTS

| | | | |
|---|---|---|---|
| 4,217,646 | 8/1980 | Caltagirone et al. | 364/505 X |
| 4,298,943 | 11/1981 | Tompson et al. | 364/505 |
| 4,335,847 | 6/1982 | Levine | 165/12 X |
| 4,368,509 | 1/1983 | Li | 364/148 |
| 4,410,938 | 10/1983 | Higashiyama | 364/550 X |
| 4,700,887 | 10/1987 | Timmons | 236/49.3 |
| 4,725,001 | 2/1988 | Carney et al. | 165/12 X |
| 4,733,719 | 3/1988 | Levine | 165/12 |
| 4,742,475 | 5/1988 | Kaiser et al. | 236/49.3 X |
| 4,819,714 | 4/1989 | Otsuka et al. | 364/557 X |
| 4,841,450 | 6/1989 | Fredriksson | 364/133 X |
| 4,864,490 | 9/1989 | Nomoto et al. | 364/148 X |
| 4,897,798 | 1/1990 | Cler | 364/557 X |
| 4,916,642 | 4/1990 | Kaiser et al. | 236/49.3 X |
| 4,931,948 | 6/1990 | Parker et al. | 364/505 |
| 4,965,742 | 10/1990 | Skeirik | 364/513 |
| 4,970,644 | 11/1990 | Berneking et al. | 364/422 |
| 5,103,391 | 4/1992 | Barrett | 364/133 |

*Primary Examiner*—Kevin J. Teska
*Attorney, Agent, or Firm*—McAndrews, Held & Malloy, Ltd.

[57] ABSTRACT

A highly distributed direct digital process control system for use in controlling a fully distributed process includes at least one device controller independently monitoring and controlling a plurality of external devices for performing a complete process. One or more data concentrator units are connected to the controllers for collecting information from each controller as well as directing updated control information to specific controllers. A central information processing system is connected to the data concentrator for displaying information received from the data concentrator. The central information processing system is capable of updating control information used by specific controllers.

21 Claims, 13 Drawing Sheets

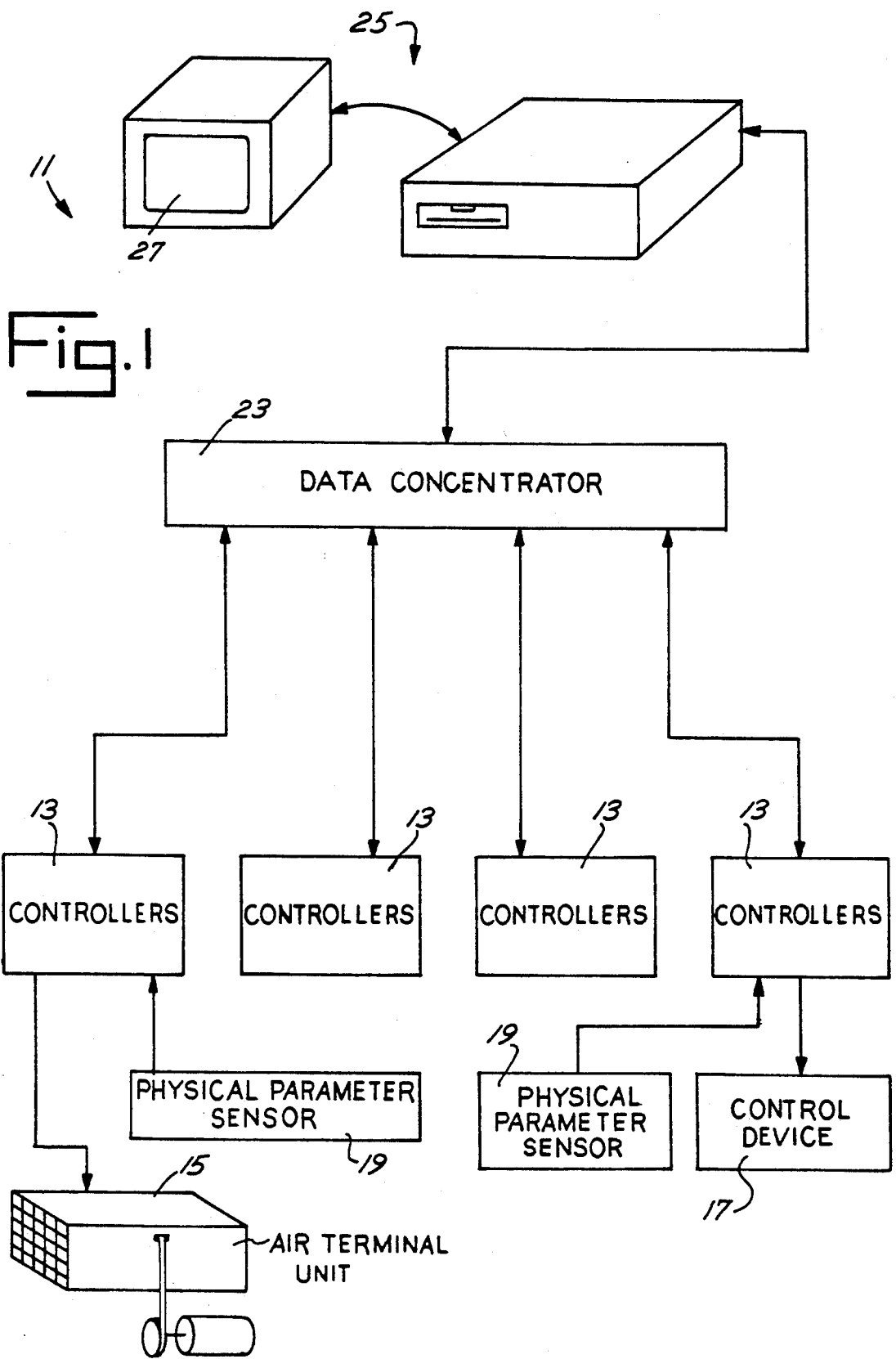

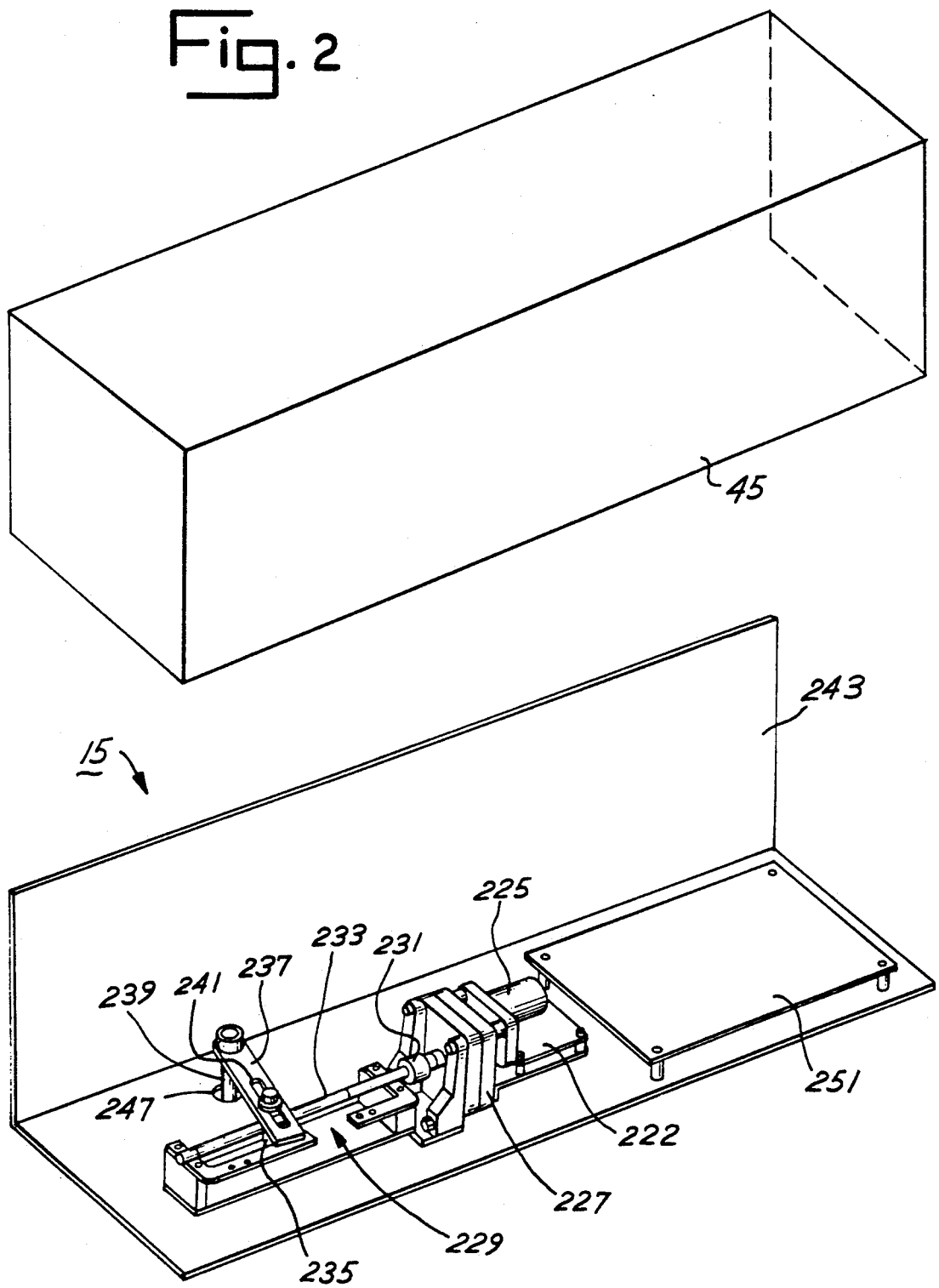

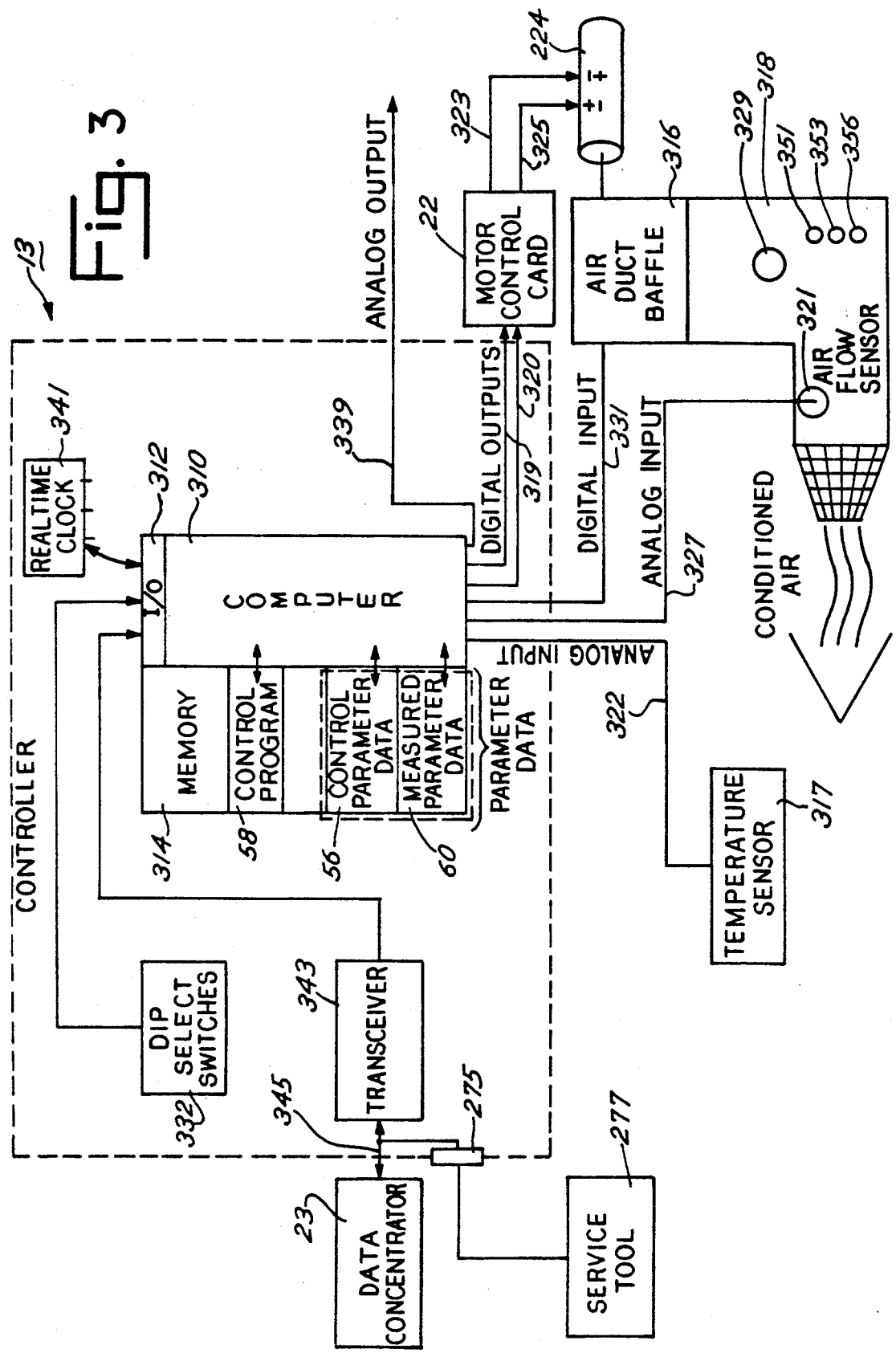

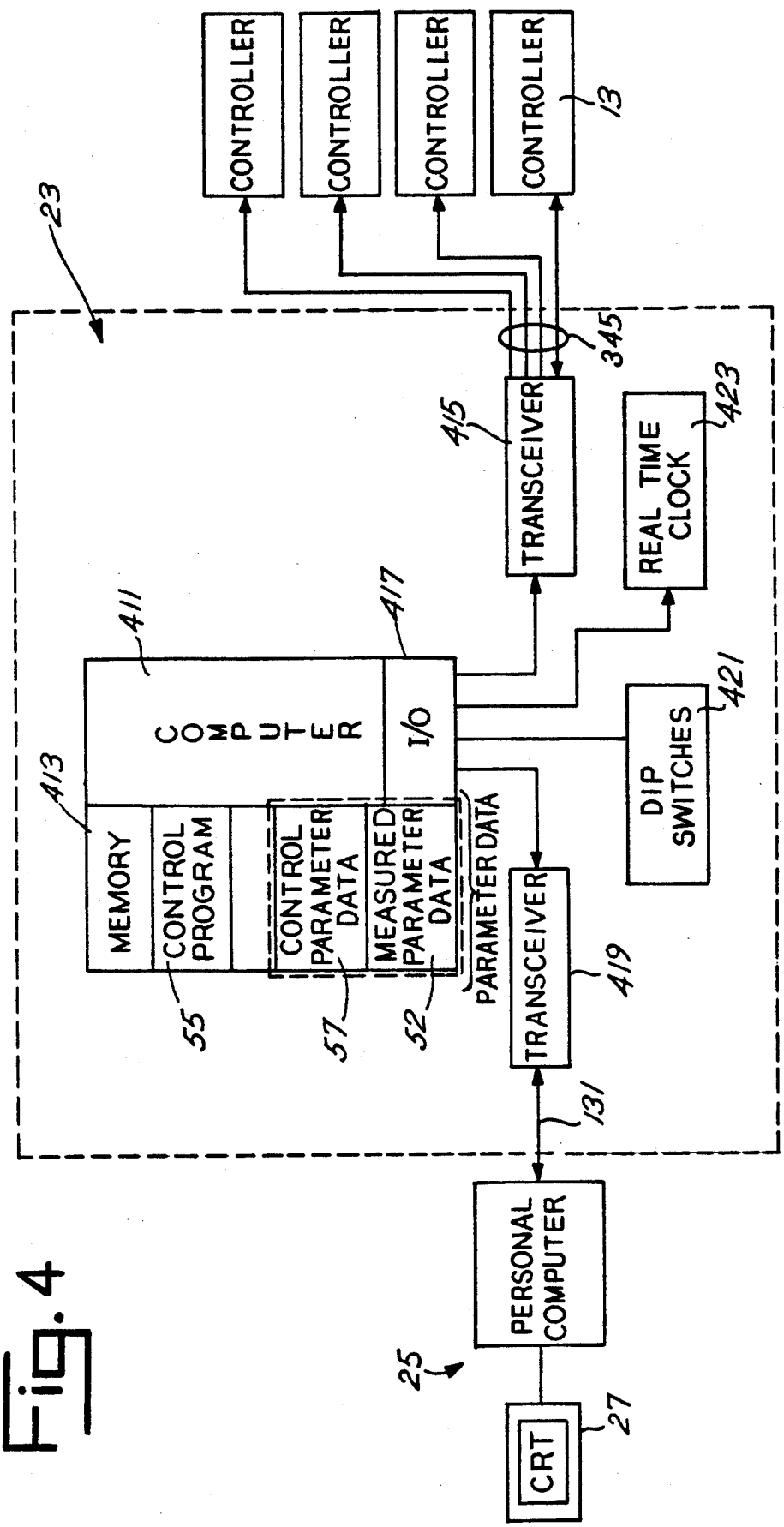

Fig. 7

711 — PRIMARY ACCESS SCREEN

| DEVICE | # OF DEVICES |
|---|---|
| 1) VAV | (6) |
| 2) CHILLER | (1) |
| 3) BOILER | (0) |
| 4) FAN | (1) |
| 5) OPTIMIZER | (1) |
| 6) LOAD SHEDDER | (1) |
| 7) ROOF TOP | (6) |
| 8) START/STOP | (1) |
| 9) HEATER | (7) |
| A) AIR HANDLER | (1) |
| B) HOLIDAY | (1) |

Fig. 8

| TEMPERATURE/CFM | VAV | STATUS OPEN/CLOSE ON/OFF ALARM | | |
|---|---|---|---|---|
| ZONE TEMP | 0°F | TEMP ALARM | N | [13] — 811 |
| ACTUAL CFM | 0 CFM | FULL OPEN | N | 16 |
| SUPPLY AIR TEMP | 0°F | FULL CLOSE | N | 19 |
| | | REHEAT STG 1 | N | 22 |
| | | REHEAT STG 2 | N | 25 |
| | | REHEAT STG 3 | N | 28 |
| | | SET BACK | N | |

| | | | |
|---|---|---|---|
| SUMMER SET POINT | 74°F | ALARM ENABLE | N |
| WINTER SET POINT | 68°F | REHEAT ENABLE | N |
| SUMMER SET BACK | 88°F | MANUAL OPEN | N |
| WINTER SET BACK | 60°F | MANUAL CLOSE | N |
| HI TEMP ALARM | 88°F | HEAT MODE | N |
| LO TEMP ALARM | 55°F | SET BACK ENABLE | N |
| HI CFM LIMIT | 1000 CFM | CONTROL DISABLE | N |
| LO CFM LIMIT | 10 CFM | | |
| OPT GROUP | [01] — 827 | | |

Fig.9  911

| | GROUP 1 | | GROUP 2 | | GROUP 3 | | GROUP 4 | |
|---|---|---|---|---|---|---|---|---|
| | START | STOP | START | STOP | START | STOP | START | STOP |
| SUNDAY | 00:00 | 00:00 | 00:00 | 00:00 | 00:00 | 00:00 | 00:00 | 00:00 |
| MONDAY | 00:00 | 00:00 | 00:00 | 00:00 | 00:00 | 00:00 | 00:00 | 00:00 |
| TUESDAY | 00:00 | 00:00 | 00:00 | 00:00 | 00:00 | 00:00 | 00:00 | 00:00 |
| WEDNESDAY | 00:00 | 00:00 | 00:00 | 00:00 | 00:00 | 00:00 | 00:00 | 00:00 |
| THURSDAY | 00:00 | 00:00 | 00:00 | 00:00 | 00:00 | 00:00 | 00:00 | 00:00 |
| FRIDAY | 00:00 | 00:00 | 00:00 | 00:00 | 00:00 | 00:00 | 00:00 | 00:00 |
| SATURDAY | 00:00 | 00:00 | 00:00 | 00:00 | 00:00 | 00:00 | 00:00 | 00:00 |

| | GROUP 5 | | GROUP 6 | | GROUP 7 | | GROUP 8 | |
|---|---|---|---|---|---|---|---|---|
| | START | STOP | START | STOP | START | STOP | START | STOP |
| SUNDAY | 00:00 | 00:00 | 00:00 | 00:00 | 00:00 | 00:00 | 00:00 | 00:00 |
| MONDAY | 00:00 | 00:00 | 00:00 | 00:00 | 00:00 | 00:00 | 00:00 | 00:00 |
| TUESDAY | 00:00 | 00:00 | 00:00 | 00:00 | 00:00 | 00:00 | 00:00 | 00:00 |
| WEDNESDAY | 00:00 | 00:00 | 00:00 | 00:00 | 00:00 | 00:00 | 00:00 | 00:00 |
| THURSDAY | 00:00 | 00:00 | 00:00 | 00:00 | 00:00 | 00:00 | 00:00 | 00:00 |
| FRIDAY | 00:00 | 00:00 | 00:00 | 00:00 | 00:00 | 00:00 | 00:00 | 00:00 |
| SATURDAY | 00:00 | 00:00 | 00:00 | 00:00 | 00:00 | 00:00 | 00:00 | 00:00 |

F1-HELP  F2-CALIBRATE  F3-DISPLAY  F4-NAME  F9 CONTROLS  ESC-EXIT

Fig.10  1001

HOLIDAY SCHEDULE

| HOLIDAY | MONTH/DAY | START | STOP | START/STOP GROUP 1 2 3 4 5 6 7 8 |
|---|---|---|---|---|
| 01 | 00/00 | 00:00 | 00:00 | N N N N N N N N |
| 02 | 00/00 | 00:00 | 00:00 | N N N N N N N N |
| 03 | 00/00 | 00:00 | 00:00 | N N N N N N N N |
| 04 | 00/00 | 00:00 | 00:00 | N N N N N N N N |
| 05 | 00/00 | 00:00 | 00:00 | N N N N N N N N |
| 06 | 00/00 | 00:00 | 00:00 | N N N N N N N N |
| 07 | 00/00 | 00:00 | 00:00 | N N N N N N N N |
| 08 | 00/00 | 00:00 | 00:00 | N N N N N N N N |
| 09 | 00/00 | 00:00 | 00:00 | N N N N N N N N |
| 10 | 00/00 | 00:00 | 00:00 | N N N N N N N N |
| 11 | 00/00 | 00:00 | 00:00 | N N N N N N N N |
| 12 | 00/00 | 00:00 | 00:00 | N N N N N N N N |
| 13 | 00/00 | 00:00 | 00:00 | N N N N N N N N |
| 14 | 00/00 | 00:00 | 00:00 | N N N N N N N N |
| 15 | 00/00 | 00:00 | 00:00 | N N N N N N N N |
| 16 | 00/00 | 00:00 | 00:00 | N N N N N N N N |

13 MAY 89 -15:00:42    M.T. McBRIAN COMPANY INC  BUILDING
1-HELP  F2-CALIBRATE  F3-DISPLAY  F4-NAME  F9-CONTROLS  ESC-EXIT

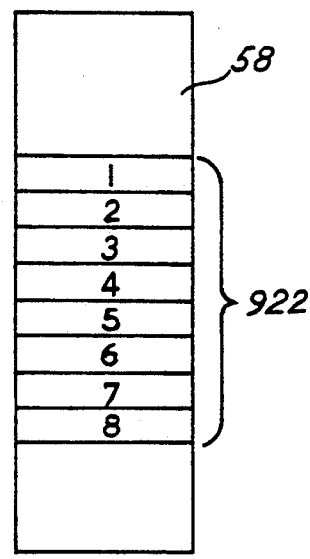
Fig. 11-A
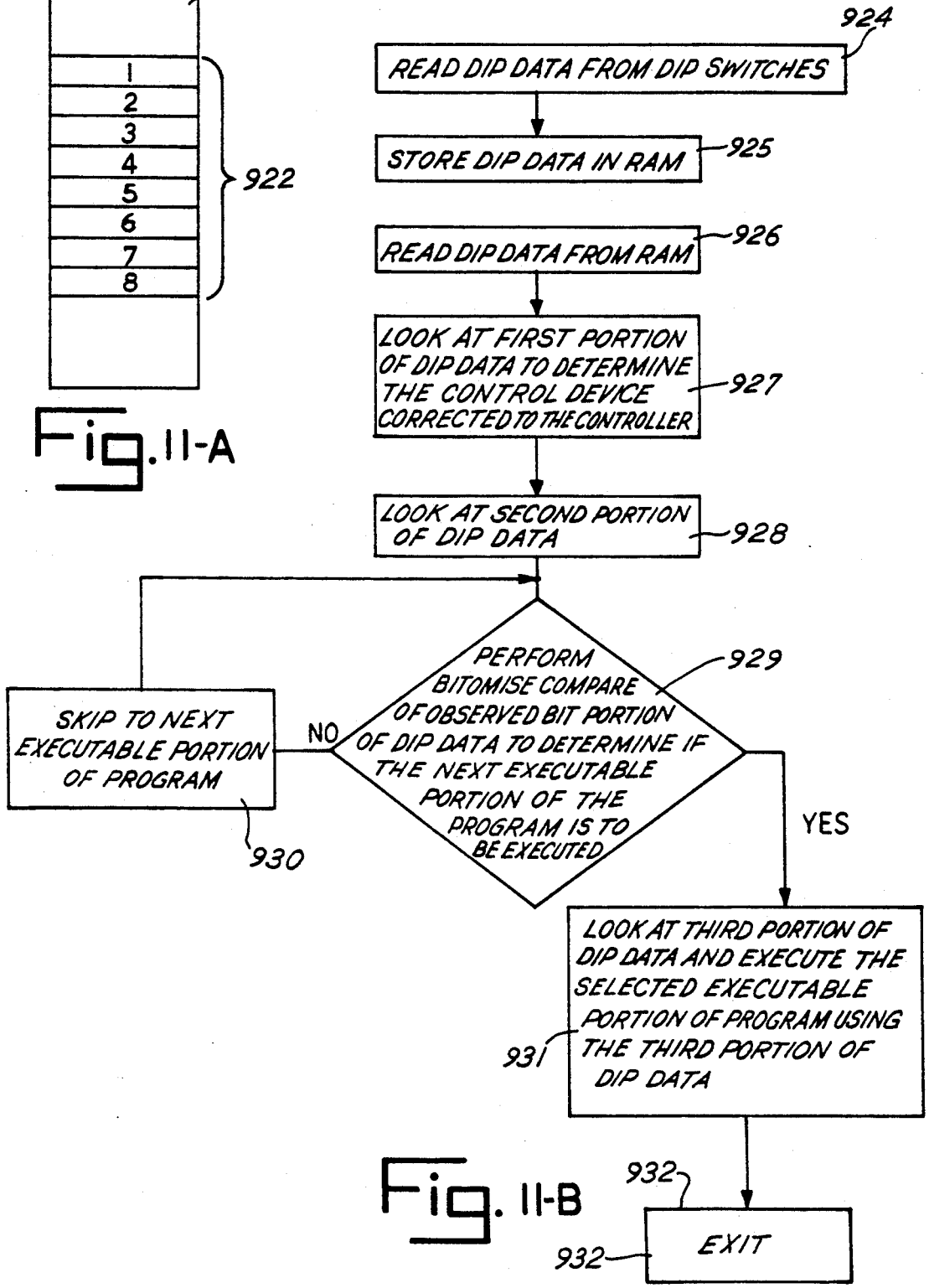
Fig. 11-B

RECONFIGURABLE CONTROLLER FOR MONITORING AND CONTROLLING ENVIRONMENTAL CONDITIONS

This application is a continuation of application Ser. No. 07/546,000, filed Jun. 28, 1990, now abandoned which is a divisional of 07/359,995 filed May 31, 1989, now Pat. No. 5,103,391 which is a continuation-in-part of application Ser. No. 07/105,804 filed Nov. 6, 1987, now abandoned.

BACKGROUND OF THE INVENTION

This invention relates to a process controller, and more particularly, relates to a controller for a process requiring feedback operation, with the controller being highly distributed in the sense that each mechanical or electro-mechanical operation involved in the process is independently controlled at the location of the device to be controlled.

Automatic process and related controllers having electronic feedback operation of mechanical and related devices have been used in the prior art. Examples include such simple devices as thermostats designated to control a single parameter such as temperature, and range to far more complicated devices using a main frame or mini computer to monitor and control large numbers of parameters. In the later circumstances, process controllers have typically been configured with a single central processing unit receiving data from a large variety of sources. The CPU processing the data and then uses that data to operate a large number of controlled devices.

In the prior art, process and related controllers have rarely been highly distributed. For example, when large main frame or mini-computer systems have been used, all data processing is conducted at a single location and decisions by the data processing unit to vary a controlled device are made by the central processing unit. Only when relatively simple control systems are used, such as thermostats, have "process" controllers been highly distributed. In those instances, the controllers have been highly restricted in their ability to monitor and control, in a coordinated fashion, multiple parameters. Usually, only a single parameter has been controlled by a distributed controller, or at best two or three.

Centrally operated process controllers have in the past been used with direct digital control allowing the digital commands from a conventional main frame or mini-computer to be used to control, after signal processing through a digital to analog converter, one or more devices. The limited distributed controllers, have however not been digital controllers but, as in the case of thermostats, have exclusively been analog systems.

Direct digital control systems in the past have typically incorporated a central control system, usually the computer's single processing unit. To increase flexibility, prior art direct digital control units have used a plurality of field panels multiplexed to the central processing units. Each field panel allowed adjustment of parameters to be monitored and controlled, usually for a process conducted in a particular sector. In a few circumstances, individual field panels have been replaced with small microcontroller based central processing units, allowing distribution of intelligence closer to the device or parameter to be operated or monitored. However, the prior art has not included digital intelligence which is capable of monitoring and controlling a fully distributed process from the actual control point. Prior art devices which are located at the actual control point have digital intelligence which only monitors and controls discrete functions of an overall process. These devices require intervention from a central processing unit which distributes the various functions in order to perform a complete process.

Accordingly, it is an object of this invention to provide an intelligent direct digital process control system that is highly distributed at the actual location of the process to be controlled. In addition, it is an object of the present invention to provide a highly distributed process control system which is capable of coordinating a large number of parameters and device controls.

A further object of this invention is to provide such a highly distributed process control system that is extremely flexible so that the process controller can be used over a wide range of systems, including electric, pneumatic or electro-mechanical, and acting in response to a wide variety of parameters such as pressure, temperature, control setting, switch closure, or any analog or digital representation of a physical condition.

SUMMARY OF THE INVENTION

These, and many other objects of the invention are achieved in a highly distributed direct digital process control system which includes at lease one device controller having its own data processing unit for monitoring a plurality of analog and digital inputs and outputs. The data processing unit of each controller operates external sensing devices in response to parameters which are measured by external sensing devices. The system also includes one or more data concentrator units which store information generated by one or more controllers in a condensed format for transmission on to a central information processing means. In addition, each data concentrator unit serves to direct updated control information which is generated by the central information processing means to specific controllers within the system. Each controller operates independently of the data concentrators and central information processing means. In the preferred embodiment, the central information processing means includes a personal computer capable of displaying information received from one or more data concentrators.

BRIEF DESCRIPTION OF THE DRAWINGS

FIG. 1 is a block diagram representation of the climate monitoring and controlling system embodiment of the present invention.

FIG. 2 is a perspective view of a device controller unit with integral serial means.

FIG. 3 is a block diagram illustrating the operation of each controller of FIG. 1.

FIG. 4 is a block diagram illustrating the operation of the data concentrator of FIG. 1.

FIGS. 5 and 5A–5C are schematic drawings illustrating the circuitry for each controller of FIG. 1.

FIGS. 6 and 6A–6C are schematic drawings illustrating the circuitry for the data concentrator of FIG. 1.

FIG. 7 is a view of the preferred embodiment of the primary access screen of the personal computer of FIG. 1.

FIG. 8 is a view of the preferred embodiment of the display format of the personal computer of FIG. 1.

FIG. 9 is a view of the preferred embodiment of the optimal group format of the personal computer of FIG. 1.

FIG. 10 is a view of the preferred embodiment of the holiday schedule of the personal computer of FIG. 1.

FIG. 11A is a representation of the application specific executable portions of the control program of the preferred embodiment.

FIG. 11B is a flow diagram of the preferred embodiment of the portion of the control program responsible for the selection of an executable portion of FIG. 11A.

DETAILED DESCRIPTION OF THE PREFERRED EMBODIMENT

Figure 5A:
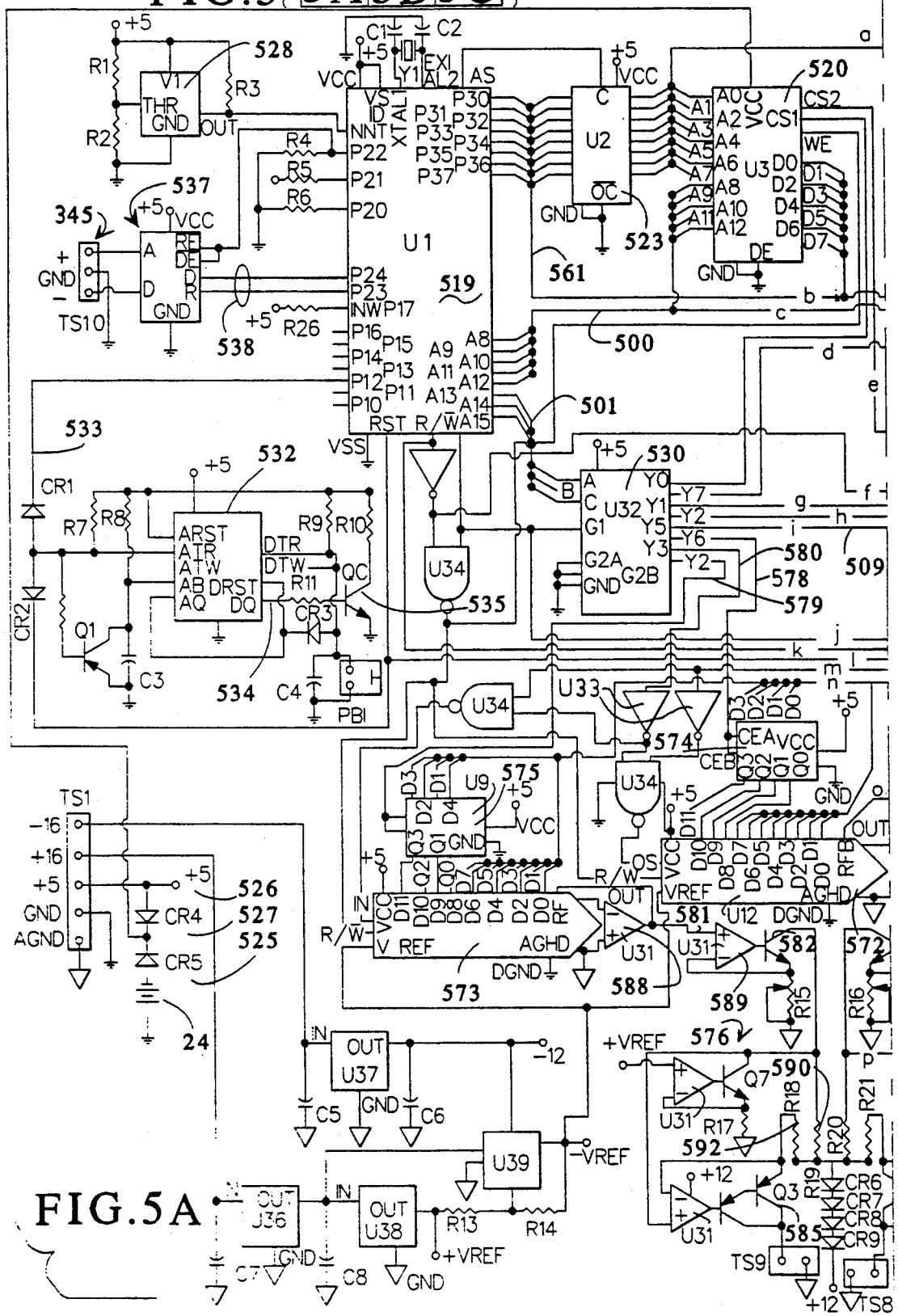

Referring to FIG. 1, a control system 11 monitors and controls climate conditions in a large office building. System 11 includes a plurality of device controllers 13 each having a connected air terminal unit 15 or other control device 17 and one or more physical parameter sensors 19. Controllers 13 are connected to a data concentrator 23 which stores condensed information retrieved from each separate controller 13. Data concentrator 23 communicates with a personal computer 25 in order to receive commands from the operator of the system as well as to communicate data to the operator via a CRT display 27.

Each controller 13 receives and processes data measured by a physical parameter sensor 19 in order to generate control signals which operate, for example, air terminal unit 15. As shown in FIG. 2, air terminal unit 15 includes a servo mechanism comprised of a drive motor 225, a reduction gear mechanism 227 and a worm gear torque mechanism 229. Drive motor 225 responds to electrical current for rotating its output shaft (not shown) which is coupled to gear mechanism 227. Gear mechanism 227 converts the rotational rate of the motor output shaft through gears to a slower rotational rate developed through a coupling 231 to a shaft 233 of worm gear mechanism 229. Shaft 233 is threaded for threadably receiving a drive member 235. As shaft 233 rotates, drive member 235 is moved along the shaft. Motor 225 can be rotated in a clockwise or a counter-clockwise direction, depending upon an electrical signal generated by a motor control card 22, so as to move drive member 235 in either direction along shaft 233.

A control arm 237 is fixed to a damper rod 239 and is carried along shaft 233 by drive member 235. Drive member 235 slides within a slot 241 of arm 237 as the drive member moves back and forth along shaft 233. The drive member serves to turn control arm 237 with respect to the axis of rod 239. As motor 225 is rotated, damper rod 239 is rotated. The damper rod is connected to a conventional air damper baffle 316 (FIG. 3). A pair of limit switches (not shown) are disposed on each end of shaft 233 for generating signals which shut down motor 225 when the damper baffle achieves a full open or full closed position. As understood, the damper baffle controls the amount of air passing through its associated air duct 318 (FIG. 3) in order to cool or heat the room wherein a temperature sensor 317 (FIG. 3) is placed.

As shown in FIG. 2, air terminal unit 15 is mounted on an angled support board 243 which connects to a cover 245. Damper rod 239 passes through an aperture 247 in the board. In addition, controller 13 may be constructed on a printed circuit board 251 which is also mounted on support board 243. Also, a power supply (not shown) which is associated with the air terminal unit may be mounted on angled support board 243.

Referring to FIG. 3, controller 13 includes a microprocessor computer 310 capable of independently monitoring and controlling the operation of an air terminal unit 15 according to environmental parameters which are measured by a temperature sensor 317 and an air flow sensor 321. Computer 310 converts the measured parameters to digital data, i.e., measured parameter data 60, and then stores the measured parameter data in a RAM 314. A control program 58 and a set of predetermined default control parameters in the form of parameter data 56 are also stored in RAM 314. Control program 58 includes, for example, an algorithm which generates damper baffle position data using the measured parameter data 60 and control parameter data 56. Control program 58 includes all possible instructions essential for generating control signals appropriate to any type of air terminal unit 15 to which the controller 13 could be connected. Control program 58 comprises a plurality of executable portions which are selectively executed in accordance with the particular type of device to be monitored and controlled by controller 13. The default set of control parameters provides data specifying to computer 310 the environmental conditions to be maintained. The default control parameters include data which is pertinent to particular applications of controller 13. As described hereinafter, a control parameter included in the default set may be overridden by entering a control parameter update at personal computer 25 (FIG. 1).

Control parameter data 56 comprise temperature set points which specify to computer 310 the temperature to be maintained during certain periods of time. In addition, control parameter data 56 may include air flow settings which specify to computer 310 the volume of air to be blown into an area per unit time.

Under instruction of the control program, computer 310 periodically compares the measured parameter data 60 against the corresponding control parameter data 56. A discrepancy between the measured parameter data 60 and control parameter data 56 will cause computer 310 to generate control signals enabling air terminal unit 15 to adjust the baffle to effect the measurable parameters accordingly. As understood, controller 13 may be adapted for use with a control device 17 (FIG. 1) in applications other than the control of an air terminal unit by loading a different control program and default set of control parameters into RAM 314.

A plurality of manually configurable DIP select switches 332 are connected to the I/O port 312 of computer 310 for changing the control program to operate controller 13 in accordance with the particular control device 17 to be monitored and controlled by controller 13. The DIP switches are configured to select portions of control program 58 which are to be executed by computer 10 for the monitoring and control of specific types and numbers of external control devices 17 physically connected to the controller. Thus, controller 13 is configurable to monitor and control various external devices by altering the switch setting of DIP switches 332. The configuration of DIP switches 332 indicates to computer 310 the particular external devices to be monitored and controlled according to a particular control program loaded into RAM.

In the preferred embodiment, computer 310 performs a self diagnostic test at power-up to check consistency between the configuration of the dip switches and external physical parameter sensor(s) 17 to be monitored. Should the configuration of the DIP switches not be consistent with the external physical parameter sensor 17 to be monitored by controller 13, computer 310 will generate an alarm which is transmitted as a measured parameter 60 to personal computer 25 for display.

In the preferred embodiment, should the measured parameters monitored by computer 310 fall outside of a range bounded by a high limit and a low limit control parameter, computer 310 generates a signal causing an alarm to be displayed at personal computer 25 (FIG. 1). The alarm is indicative of a controller malfunction which is causing the controller to produce or overlook undesirable environmental conditions.

In applications involving several controllers which are connected to a single data concentrator 19 (FIG. 1), a portion of the DIP switches may be manually configured to assign a unique board address to each controller. This permits the data concentrator to communicate with a particular controller 13 as identified by a board address.

The "application" of controller 13 as shown in FIG. 3 involves the control of an air terminal unit 15. In such an application, a temperature sensor 317 senses the temperature of a room wherein the sensor is located. Sensor 317 generates an analog input signal along a conductor 322 which signal is proportional in magnitude to the temperature sensed. Computer 310 converts the analog signal on conductor 322 to a corresponding digital signal which is stored in RAM 314 as measured parameter data 60.

Operating under the instruction of the control program 58, computer 310 compares the measured temperature parameter data to a pre-determined temperature set point residing in RAM 314 as control parameter data 56. Should a discrepancy exist between the temperature set point data and the measured temperature data, computer 310 generates binary signals onto a pair of digital output conductors 319,320 which are electrically connected to motor control card 222. Motor control card 222 processes the incoming digital signals in order to generate polarized potentials onto a pair of conductors 323, 325 which are connected to the terminals of D.C. motor 225. Depending upon the polarity placed at its terminals, D.C. motor 225 will operate in either a clockwise or a counterclockwise direction for mechanically opening or closing air duct baffle 316. As understood, motor 225 positions air duct baffle 316 in order to control the amount of conditioned air passing through vent or air duct 318 which is located in the same room as temperature sensor 317.

An air flow sensor 321 monitors the rate of air flow in vent 318 and generates signals which are used by computer 310 to adjust the position of air duct baffle 316. Air flow sensor 321 measures the volume of air passing through vent 318 per unit time and generates an analog input signal along a conductor 327 which signal is proportional in magnitude to the measured air flow rate. Computer 310 converts the analog signal on conductor 327 to a corresponding digital signal which is stored in RAM 314 as measured parameter data 60. The measured air flow parameter data is accessed by computer 310 for comparison with a corresponding air flow control parameter data 56 residing in RAM. Should a discrepancy exist between the control parameter and the measured airflow parameter, computer 310 will generate control signals in order to set the polarity of motor 225 for adjusting the position of air baffle 316.

As understood, conditioned air continues to flow into the room until the temperature within the room reaches that specified by the predetermined temperature set point. When the temperature sensed by temperature sensor 317 matches the predetermined temperature set point, computer 310 generates a signal causing motor 225 to close air duct baffle 316.

A supply air temperature sensor 329 monitors the temperature of the air passing through duct 318 in order to generate input signals which are processed by computer 310. Computer 310 generates output signals which control the operation of up to three digitally activated heaters 331, 333, and 335 position in duct 318.

A pair of limit switches (not shown) generate warning signals on digital input conductor 337 which specify to computer 310 that the air duct baffle 316 has achieved a full-open or full-closed position. Upon receiving a warning signal, computer 310 generates a digital output signal which turns off motor 225 thereby preventing motor burn-up due to overloading.

In addition, computer 310 is capable of generating analog output signals along a conductor 339 for supplying a control voltage or current to external devices such as a variable speed motor (not shown) which may be housed in a different type of air flow control device 17.

A real time clock 341 is connected to the I/O port 312 of computer 310 for supplying the computer with real time data. Computer 310 monitors the real time data in order to maintain climate conditions defined by a set of predetermined control parameters during specific time intervals which are bounded by a set of predetermined time-on/time-off limits stored in RAM 314. The time-on/time-off limits may be altered via personal computer 25 (FIG. 1) as described hereinafter.

Data concentrator 23 communicates with computer 310 through a serial transceiver 343 which acts as an interface between the I/O port 312 of computer 310 and data concentrator 23. Data concentrator 23 generates a data request having an address corresponding to a particular controller 13 for retrieving measure parameter data 60 and control parameter data 56 which together comprise parameter data from that controller. The data request is serially transmitted from the data concentrator to transceiver 343 via a serial communication line 345. Upon receiving the first bit of serial data, transceiver 343 generates a signal which, when read by computer 310, instructs the computer to begin execution of a data receive routine which comprises a portion of control program 58. Operating under the instruction of the data receive routine, computer 310 serially receives the data request via transceiver 343. Upon receiving the entire data request, computer 310 compares the board address specified by the configuration of DIP switches 332 to the address specified within the data request. Should the board address match that associated with the data request, the computer 310 will begin execution of a data transmission routine which also comprises a portion of the control program 58. By executing the instructions of the data transmission routine, computer 310 serially transmits control parameter data 56 and the measured parameter data 60 along serial communication line 345 via transceiver 343. The transmitted parameter data is stored in the data concentrator 23 where it may be accessed by personal computer 25 (FIG. 1) as described hereinafter.

In a similar manner, updated control parameters which are entered through personal computer 25 (FIG. 1) in the form of a control parameter update may be sent by data concentrator 23 to computer 310 via transceiver 343. Upon receiving a control parameter update request from data concentrator 23, computer 310 compares the board address specified by the configuration of DIP switches 332 to the address specified within the control parameter update request. Should the board address match that associated with the control parameter update request, computer 310 begins execution of a data update routine. By executing the data update routine, computer 310 stores the particular updated control parameters which are sent via data concentrator 23 along with the other stored control parameters in data 56.

As illustrated in FIG. 3, a service tool 277 may be interfaced with controller 13 through service connector 275. Service tool 277 is capable of generating data requests for obtaining measured parameter data 60 and control parameter data 56 from controller 13. The obtained data may be displayed to the service operator via tool 277. Likewise, the service tool is capable of generating control parameter updates for entering updated control parameters into RAM 314 of computer 310. The updated control parameters are stored in RAM 314 as control parameters which may be accessed by personal computer 25 (FIG. 1) for viewing. In addition, service tool 277 is capable of overriding control program 58 executed by computer 310 in order to directly control various functions of air terminal unit 15.

Referring now to FIG. 4, data concentrator 23 includes a microprocessor computer 411 which together with associated circuitry functions as a data gateway between at least one controller and personal computer 25. Computer 411 periodically polls each controller 13 to which the data concentrator is connected for obtaining measured parameter data 60 and control parameter data 56 (FIG. 3). The measured parameter data and control parameter data gathered by data concentrator 23 are stored in a RAM 413 at locations 52 and 57 respectively. As understood personal computer 25 may access for viewing the measured and control parameters stored in RAM locations 52, 57 of the data concentrator. In accordance with the periodicy of the polling, the measured parameter and control parameter data are continually overwritten in RAM 413 thus permitting the personal computer to access the latest data associated with a particular controller. In addition, personal computer 25 may send updated control parameters to each controller 13 via data concentrator 23.

Operating under the instruction of a control program 55 residing in RAM 413, computer 411 sequentially generates data requests having controller addresses for periodically obtaining parameter data from each controller 13. The data requests are serially transmitted to each controller via a serial transceiver 415 which acts as an interface between the I/O port 417 of computer 411 and each of the controllers 13. Following the transmission of a data request, computer 411 begins execution of a data receive routine which comprises a portion of control program 55. The parameter data received includes measured parameters and control parameters corresponding to the controller residing at the address specified within the particular data request. The data is received serially along serial communication line 345. Under the instruction of computer 411, when executing the data receive routine, transceiver 415 serially transmits the parameter data to computer 411 to be stored in RAM 413 at locations 52 and 57. As understood, the data requests are periodically generated by computer 411 in order to sample measured parameter data 60 and control parameter data 56 (FIG. 3) from each controller 13. The parameter data called is stored in RAM 413 until overwritten by later parameter collected as a result of a subsequent data request generated by data concentrator 23. By storing the latest collected parameter data samples in RAM 413, computer 411 enables data concentrator 23 to concentrate the latest parameter data pertaining to each of many controllers 13 associated with the system 11.

The concentrated parameter data which pertains to the latest measured parameters and control parameters of each controller 13 may be accessed by personal computer 25 and displayed on CRT 27. Should an operator desire to view the latest measured parameters and control parameters corresponding to a particular controller, personal computer 25 will generate an information inquiry having a particular address for retrieving controller specific parameter data stored in data concentrator 23. The information inquiry is serially transmitted to computer 411 via a serial transceiver 419. Upon processing the information inquiry, computer 411, in cooperation with transceiver 419, serially transmits the parameter data which corresponds to the address specified within the information inquiry to personal computer 25 for viewing.

In addition to storing the latest concentrated parameter data, data concentrator 23 transmits control parameter updates to a specific controller 13. The updated control parameter is entered by an operator via personal computer 25 and transmitted to computer 411 via transceiver 419. The update is temporarily loaded into RAM 413 at location 57. When transmission of the control parameter update from personal computer 25 has been completed, computer 411, in cooperation with transceiver 415, serially transmits the control parameter update along serial communication line 345. Should the address specified within the control parameter update match that of a specific controller 13, the controller 13 will store the updated control parameter in RAM 314 (FIG. 3). As previously mentioned, the control parameters provide each controller 13 with operative data such as temperature set points and time on/time off limits.

In applications requiring the use of several data concentrators which are all connected to a single personal computer 25, a plurality of DIP switches 421 connected to the I/O port 417 of computer 411 may be set to assign each data concentrator a unique board address As a result, control parameter updates will also carry address information of a specific data concentrator as well as address information of a specific controller. Thus, the updates are directed to a specific data concentrator to which the specified controller is connected.

Data concentrator 23 includes a real time clock 423. At initialization of the overall system 11 (FIG. 1), the real time clock 423 generates real time data which is passed to each controller 13 for initializing and synchronizing real time clocks 341 (FIG. 3) of the controllers.

Referring to FIG. 7, a primary access screen 711 is generated by personal computer 25 onto CRT 27. Screen 711 serves as a main menu for identifying the particular controllers which are attached to system 11. As illustrated, the system 11 may be configured to simultaneously control several different control devices. DIP data associated with the configuration of the DIP select switches 332 (FIG. 3), is processed by computer 310 to identify the particular control device connected in the system. For example, screen 711 indicates the device "VAV" which is an air terminal unit 15 as described above. Screen 711 indicates that there are 6 such devices attached in the system. The second line is identified as "CHILLER" which is a controller 13 for controlling water cooled coils in a cooling system. The third line identifies a "BOILER" showing that there are no boiler units attached to the system. A boiler controller 13 may be used to merely turn on or off the boiler or it may have other control functions such as monitoring water level and the like. The fourth line identifies a "FAN" and may be a controller 13 for controlling a large fan in which the on/off switch and speed may be controlled. The fifth line in display 711 indicates an "OPTIMIZER" controller which is an intelligent early start control device which monitors temperatures outside of the building to sense outside conditions as well as monitors temperature inside the building to sense inside building conditions; such temperatures are used to turn a furnace or air conditioner ON at the appropriate time in order to bring the inside temperature to a set point temperature by a set point time identified in the parameter data. That is, the optimizer may turn on a furnace 10 minutes in advance of the set time in order to bring the temperature in the building area to the set point temperature by the set time.

Display 711 shows a "LOAD SHEDDER" in line 6 which serves as an energy demand controller or energy conserving device. The load shedder controller sets an energy level or maximum power consumption target. When another energy consuming device wants to turn on, the Load Shedder controller turns off another device, on a priority basis, to control power consumption relative to the target value.

Line 7 in display 711 indicates a "ROOFTOP" controller which controls an air conditioning unit(s) that are on a rooftop for controlling heating, ventilation, and cooling of a building. Line 8 in display 711 is used to address the optional group table in FIG. 9, described hereinafter Line 9 indicates a "HEATER" controller, and line A indicates an "AIR HANDLER" controller both of which are controllers for controlling other devices used to heat and handle air in a building. Line B is a "HOLIDAY" controller which is described hereinafter.

Each controller 13 (FIG. 1) may be adapted to monitor and control a particular control device 17 (FIG. 1) by loading a device specific control program 58 and default set of control parameters 56 into RAM 314 (FIG. 3) as described hereinafter.

Data concentrator 23 polls each of the possible controller addresses to determine whether or not a controller is present and which controller, in fact, is present When a new controller 13 is added to system 11, the data concentrator learns of this and changes the main menu display 711.

Referring to FIG. 8, a display format screen 801 is generated by personal computer 25 onto CRT 27 by the operator selecting, via a key from the keyboard of the personal computer 25, one of the listed devices identified on primary access screen 711 (FIG. 7). For example, device 1, the VAV, is selected by activating key 1 when screen 711 is displayed. The selection of device 1 causes screen 801 (FIG. 8) to be displayed.

Four windows 803, 805, 807 and 809 appear on screen 801 and provide information for enabling an operator to request viewing of the latest parameter data of a specific controller 13 as well as enabling the operator to enter control parameters to control a specific controller. A list of request and update commands (which are activated by depressing particular function keys on personal computer 25) is displayed in command window 807.

A controller specification window 809 includes a numeric or pneumonic list which represents the board address of each VAV controller within system 11. There are six numerics shown in window 809 corresponding to the 6 VAV devices specified on screen 711 (FIG. 7). Using the cursor control keys (not shown) on the keyboard of personal computer 25, the operator positions a movable cursor, depicted generally as a highlighted box 811 within controller specification window 809. This serves to select one of the six numbers (13,16,19,22,28) for specifying the address of a particular controller 13 from which data is desired for viewing.

In response to the selection in window 809 together with the actuation of function key F3, as indicated in window 807, computer 25 generates an information inquiry containing the specified controller address for retrieving the latest parameter data which is stored in the data concentrator 23. Upon receiving the inquiry, data concentrator 23 accesses the latest parameter data corresponding to the specified controller and transmits the parameter data to personal computer 25. As previously mentioned, the parameter data includes measured parameters gathered by the specified controller as well as control parameters upon which the specified controller operates.

The measured parameters are displayed in a status window 803. For example, environmental temperature is indicated in window 803 as ZONE TEMP 815 and air flow rate is indicated as ACTUAL CFM (cubic feet per minute) 817 and supply air temperature is indicated as SUPPLY AIR TEMP 819. Also, the alarm generated by controller 13 when either the HI LIMIT or LOW LIMIT has been exceeded will be displayed in window 803 as a TEMP ALARM 821.

In addition there is a FULL OPEN and a FULL CLOSE indication which indicate whether or not the damper is in a FULL OPEN or a FULL CLOSE position. Also, the three heaters 351, 353, 355 (FIG. 3) are indicated as REHEAT STG 1, 2 and 3 to show whether or not each of the three heaters are operative. Also, a SET BACK indication is shown for indicating whether the set backs are enabled.

The TEMP ALARM indicator 821 will only be active when the ALARM ENABLE 823 of window 805 has been activated by the operator. The control parameters such as temperature set points are displayed in set point window 805 and may be updated by the operator.

An information inquiry generated by personal computer 25 shortly after the power up of system 11 will produce the default set of control parameters which are displayed in window 805. This default set of control parameters may be overridden by control parameters entered at personal computer 25 (FIG. 1) as described hereinafter.

The operator must specify the time-on/time-off limits associated with the control parameters appearing in window 805, by selection of one of several optimal groups associated with the time-on/time-off limits. The selected group is indicated in OPT GROUP 823 in window 805. By using the F9 key and positioning a moveable cursor 827 over the number displayed next to OPT GROUP indicator 823, a number may be entered to identify the optimal group.

As illustrated in FIG. 9, each optimal group as displayed includes several sets of time-on/time-off limits for each day of the week. These time-on/time-off limits are entered by the operator at the keyboard of personal computer 25 and then stored in the data concentrator 23 in RAM. Upon selection of the optional group using window 805 (FIG. 8) for the controller specified in window 809, the data concentrator 23 sends the selected optimal group limits to the identified controller for storage in the controllers RAM. Like the control parameters appearing in window 805 (FIG. 8), the time-on/time-off limits appearing in display format 911 (FIG. 9) may be updated via access from the primary access screen 711.

The real time clock on the controller is used to keep track of the time of day. The real time clock on the data concentrator can be used to synchronize all clocks on each of the controllers. The personal computer real time clock can be used to synchronize or update the data concentrators time clock.

As shown in FIG. 10, a holiday display 1001 may be selected for displaying and/or updating time-on/time-off limits associated with Holidays falling on particular dates. As shown in FIG. 10, the start/stop time for each holiday may be enabled or disabled separately in any one of the eight optimal groups. When enabled, the values in the holiday schedule will override the start/-stop values in the controllers for the particular holiday. The holiday schedule may be accessed from primary access screen 711 to enter holiday dates and start/stop values as well as whether such values are to be enabled for each of the eight optimal groups.

The holiday schedule as well as the optimizer and load shedder may be combined in one controller 13. The holiday schedule as shown in FIG. 10 is loaded into this controller's RAM memory via data concentrator 23. When the computer of this controller, using the real time clock, senses a holiday, it submits the holiday schedule to the data concentrator, which in turn, distributes the holiday schedule to all of the controllers. If the optimal group is enabled in the holiday schedule for the particular optimal group assigned to a particular controller, then the start/stop time for that controller is overridden by the holiday schedule.

As previously described, an operator may enter updated control parameters via personal computer 25. Referring again to FIG. 8, an operator positions the movable cursor within controller specification window 809 in order to specify the address of a particular controller 13 to which a control parameter update is to be sent. The F3 key identifies the display command which will cause the most recent parameter data associated with the particular controller to be displayed on display format screen 801. In order to make an update in the most recent control parameters appearing in the set point window 805, the operator must select the control parameter update command, F9, from those listed in command window 807. In response to the selected command, a movable cursor 827 will appear in the set point window 805. In order to update a particular control parameter, the operator positions the cursor 827 over that control parameter to be updated and enters the desired update. After all updates have been entered, the control parameter updates are sent to the corresponding controllers by selecting the F2 command. Upon acknowledgement of the update, personal computer 25 transfers a control parameter update which includes the board address of the specified controller to data concentrator 23. In turn, the data concentrator 23 sequentially transmits the control parameter update to each controller 13 in system 11. Should the board address specified within the update match that of a particular controller, that controller processes the control parameter update for storing the control parameter in RAM 314 (FIG. 3) thereby overriding the default control parameter. Upon storing the control parameter, the controller generates a signal which is sent to the personal computer 25 via data concentrator 23 to confirm receipt of the updated control parameter.

The SUPPLY AIR TEMP indicator 819 (FIG. 8) displays the temperature sensed by duct temperature sensor 329 (FIG. 3). If desired, the air within duct 318 may be heated by up to 3 digitally controlled heaters 351, 353, 355 which are enabled by entering a "Y" next to the REHEAT ENABLE indicator 831 of window 805. Should the heaters be enabled, the REHEAT STG 1,2 and 3 indicators disposed in window 803 will indicate the on/off status of each of the 3 heaters.

The intelligent control of air duct baffle 316 may be overridden by enabling either MANUAL OPEN in window 805, which opens the baffle, or enabling MANUAL CLOSE which closes the baffle. Should the baffle achieve a full open position, the FULL OPEN confirmation indicator in window 803 will respond accordingly. Likewise, the FULL CLOSE confirmation indicator will indicate a fully closed air duct baffle.

Environmental temperature is maintained according to the indicated temperature set point values However, should the SET BACK ENABLE be active, the indicated temperature set points will be substituted by the indicated temperature set back values. As understood, the temperature set back values indicate the environment temperature to be maintained during times not falling within the time-on/time-off limits (such as hours when the building is unoccupied). Activation of the SET BACK ENABLE will be indicated by the SET BACK confirmation in window 803 for indicating that the set back temperature in window 805 is operative.

The intelligent control provided by the controller 13 associated with the information displayed in windows 803,805 may be deactivated by activating the CONTROL DISABLE in window 805.

As previously mentioned, each controller 13 may be adapted for use in applications other than the monitoring and control of air terminal unit 15.

Figure 5B:
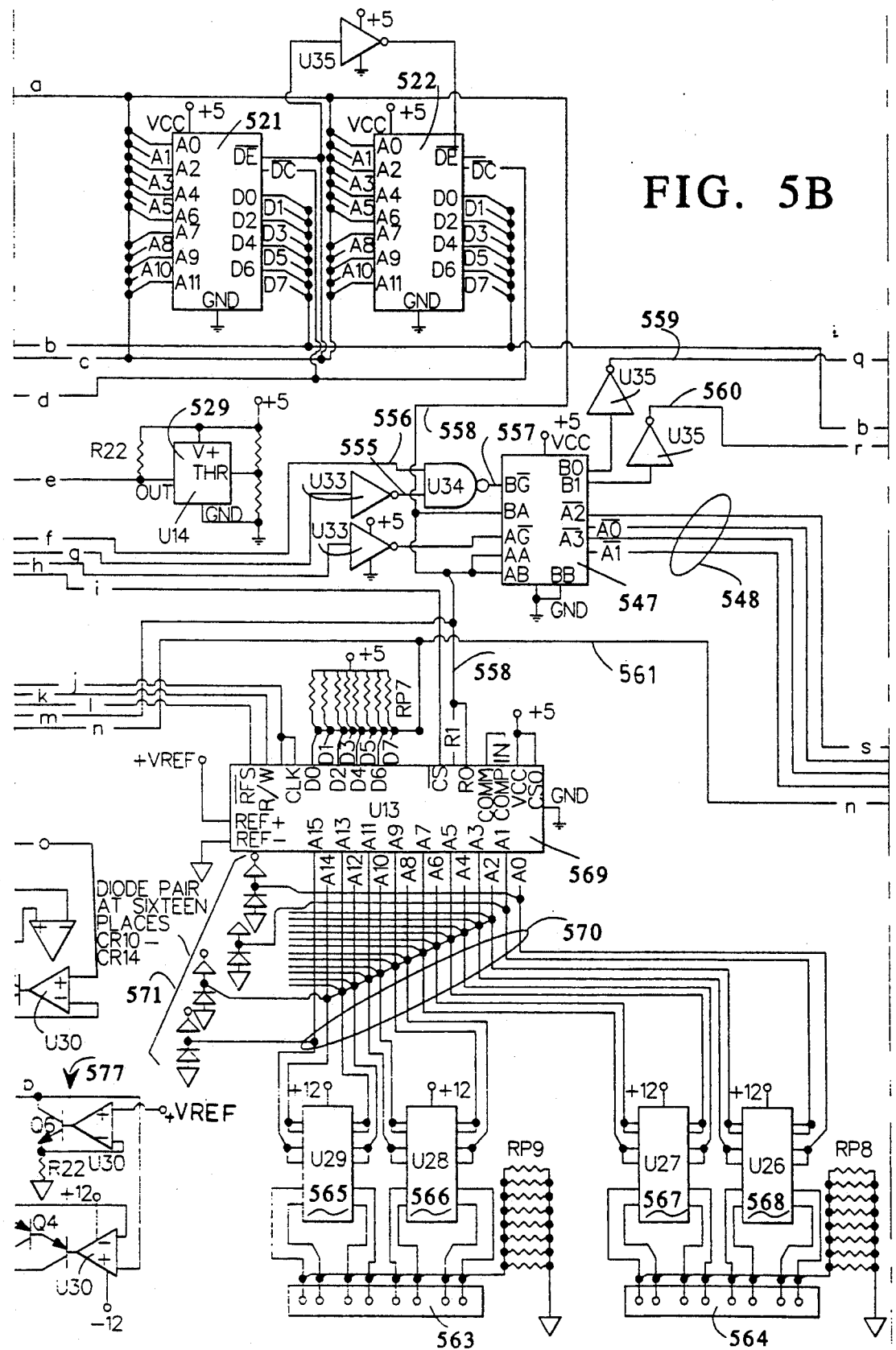
Figure 5C:
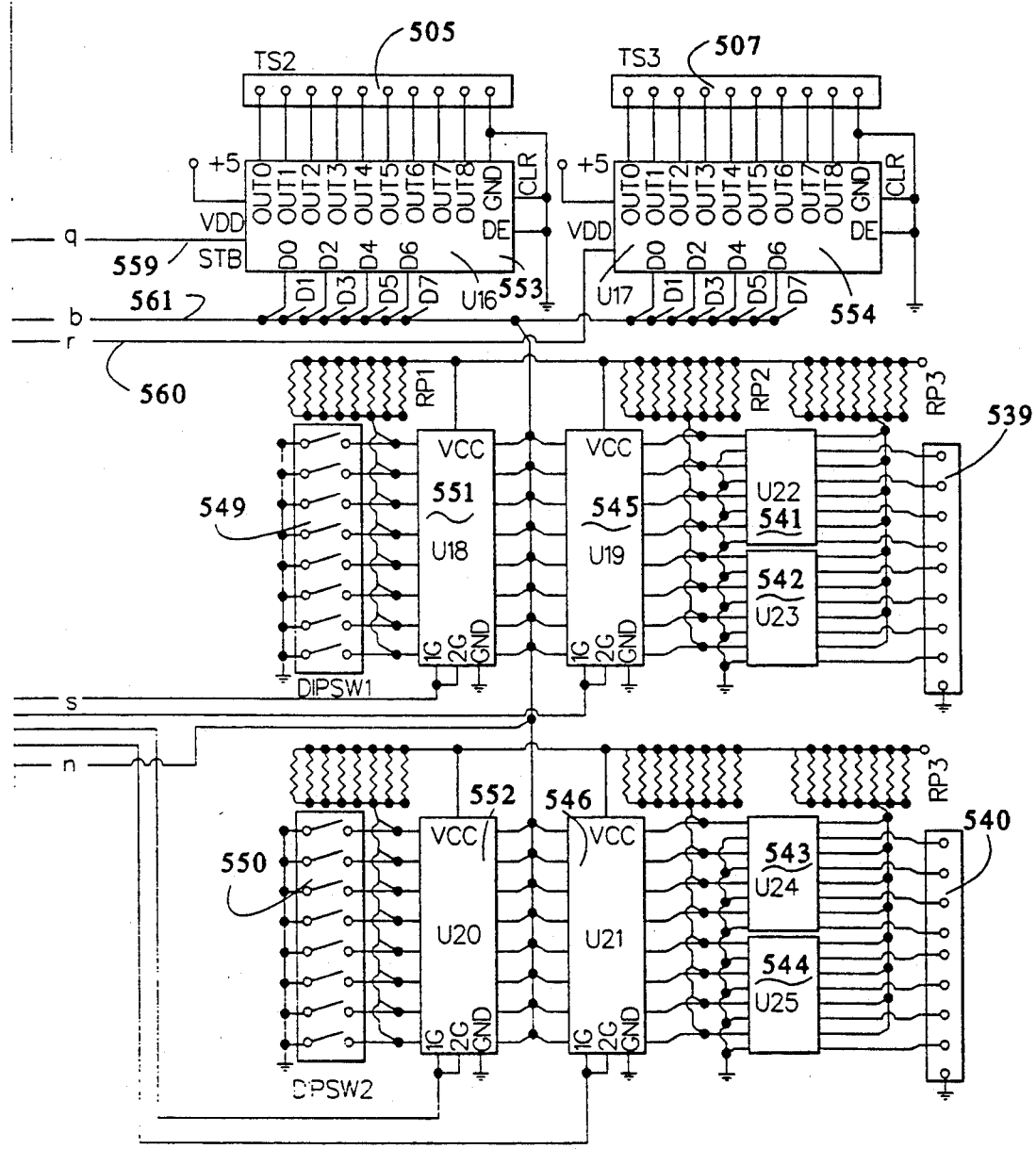

Referring now to FIG. 5, computer 310 is composed of an eight bit microcontroller 519, which operates on an interrupt basis, an 8K×8RAM 520, and an 8K×8ROM consisting of two 4K×8 EPROMS 521 and 522. In the preferred embodiment, the microcontroller is a Motorola 6803U4, a ROMLESS version of the common Motorola 6803U4 microcomputer. The RAM used with the computer 310 consists of a single chip of the type 5864, a CMOS, 8K×8RAM designed for low power battery backup. The EPROMS 521 and 522 are each of the 2732 type.

In accordance with the present invention, the application specific control program (from which microcontroller 519 receives operative instruction) along with the set of predetermined default control parameters are burned into EPROMS 521 and 522 for permanent storage. At power-up, microcontroller 519 loads into RAM 520 the control program and set of default control parameters which reside in EPROMS 521 and 522. Once in RAM, the control algorithm and control parameters may be accessed by the microcontroller for execution.

Operating under the instruction of the control program and within the limits defined by the default control parameters, controller 13 is capable of monitoring and controlling air terminal unit 15 (FIG. 1) without intervention from data concentrator 19 or personal computer 21 (FIG. 1).

Controller 13 requires intervention from data concentrator 19 and computer 21 only when an operator desires to update one of the control parameters used in the control of air terminal unit 15 (FIG. 1). Upon receiving a control parameter update from personal computer 21 via data concentrator 19, controller 13 stores the associated updated control parameter in RAM 520. After storing the updated control parameter in RAM 520, controller 13 may continue its independent control of air terminal unit 15 (FIG. 1).

The RAM 520 is capable of remaining active under very low power and voltage. Data stored in RAM is protected by a battery 524 which supplies voltage in the event of a power failure. In the preferred embodiment, the battery is a lithium based energy cell. The battery is isolated from the 5 volt power supply 526, through diode 525. The battery provides only 3.6 volts of potential, so that when the 5 Volt power supply 526 is active, diode 527 is forward biased and therefore conducts the current from the main power supply. When a 5 Volt power failure occurs, diode 527 will stop conducting, and diode 525 will become forward biased to maintain approximately 3 Volts on the RAM power inputs, thereby providing sufficient back-up power to enable the RAM to maintain stored data.

The power failure detectors 528 and 529 also assist to maintain data storage. The detectors which are of the type 8211 can be set to trigger at specific voltages by adjusting the resistance ratio at pin 3. In the event that the supply voltage drops below the set trigger voltage, the voltage detector 528 generates an interrupt signal which warns the microcontroller of impending power failure. Upon receiving the interrupt signal, the microcontroller sends the data which is present in its registers to the RAM for storage.

In a similar manner, the power fail detector 529 generates a signal to disable the RAM under low power conditions. Operating on power provided by backup battery 524, the disabled RAM prevents the microcontroller from reading or writing data. As understood, a delay exists between the detection of power failure and the disablement of RAM 520 (approximately 50 milliseconds) thereby providing sufficient time for microcontroller 519 to store the data in its registers in RAM before loss of power.

In accordance with another embodiment of the present invention, EPROMS 521 and 522 may be replaced by Electrically Erasable PROMs, E²PROMs. As understood, microcontroller 519 may write data to the E²PROMs for permanent storage. Should a particular controller application require a new or additional default control parameters, an operator may remotely burn the new or additional parameters into the E²PROMs via personal computer 521. The remotely programmable E²PROMs eliminate the task of physically removing conventional EPROMs for re-programming. As will suggest itself, the E²PROMs eliminate the need for a battery protected RAM.

The computer 310 also includes a dual timer IC 532 that serves as a fail safe detector. When subjected to external interference, the microcontroller may lose its stackpointer and attempt to execute a control algorithm which is not specific to the desired application of the controller. In order to prevent this occurrence, a prescribed pulse output, the presence of which is the criteria for faultless algorithm execution, has been programmed into the microcontroller code. As understood, the dual timer IC, of the type LM556, is constantly retriggered by the programmed pulse through capacitor 533. In the arrangement shown in FIG. 5, DQ 534 will always remain low unless a pulse is missed at which time DQ goes high and causes a reset to the microcontroller through transistor 535. Upon being reset, the microcontroller 519 outputs addresses in order to read the control program permanently stored in EPROMs 521 and 522.

The microcontroller 519 and several other analog and digital input/output devices share a common eight bit data bus 561 which carries data therebetween. Operating under the instruction of its control algorithm, microcontroller 519 periodically enables each input and output device. Upon being enabled, an input device places input data which includes measured parameters sensed by an external sensing device (not shown) onto data bus 561 to be stored in RAM. Likewise, upon being enabled, an output device delivers output data which is present on data bus 561 to an external control device (not shown). The microcontroller uses an address latch 523, typically of the type 74HC373, to sort address information and input/output data. The address strobe of the microcontroller triggers address latch 523 only when address information is present at ports P30-P37 which act as inputs to the address latch. The address latch 523 in cooperation with the address bus (A0-A7) 558 carries address information between microcontroller 519, RAM 520, and EPROMS 521, 522.

The physical address of each of the memory devices is present on address lines (A8-A12) 500. Microcontroller 519 uses the physical addresses to generate data on the upper three bits (A13-A15) of address bus 501. An address decoder 530 of the type 74HC138, decodes the data present on bus 501 in order to generate output which is used by upper/lower byte decoder 547 to generate chip select signals 548, 559 and 560 which enable input/output data to be placed on the eight bit data bus 561.

Various inputs and outputs are designed to allow the microcontroller to interact with the outside world. The configuration of DIP switches 549 and 550 specify to microcontroller 519 the executable portions of control algorithm 58 to be executed. As previously mentioned, the executable portions provide microcontroller 519 with instruction essential to the monitoring and control of specific types and numbers of external devices physically connected to the controller. DIP switches 549 and 550 thus permit manual fine tuning of the controller as required for a particular application. In addition, the configuration of DIP switches 549 and 550 assigns a unique board address to the associated controller 13.

Sixteen bits of data associated with the configuration of DIP switches 549 and 550 are placed onto data bus 561 by a pair of 8 bit tri-state buffers 551 and 552. The tri-state buffers 551 and 552 are alternately and periodically enabled by upper/lower byte decoder 547 for placing the 16 bits of data onto the 8 bit data bus 561. The 16 bits of data associated with the configuration of the DIP switches are read by microcontroller 519 and stored as input data in RAM 520. During execution of control program 58, microcontroller 519 accesses the DIP switch input data for determining which executable portions are to be executed in accordance with the external devices physically connected to controller 13.

Referring to FIG. 11A, control program 58 includes a plurality executable portions 922. Each executable portion provides controller 13 (FIG. 1) with individualized instructions which are specific to the type of air terminal unit 15 physically connected to the controller. For example, the executable portion referred to by the number 3 may include code which is required by microcontroller 519 to monitor and control one of eight different types of air terminal units. As will suggest itself, each executable portion corresponds to a specific type of air terminal unit. As mentioned above, the executable portion of control program 58, which is executed in accordance with the type of air terminal unit connected to controller 13, is specified by the configuration of the DIP switches 549 and 550.

Referring to FIG. 11B, in a step 924, microcontroller 519 periodically reads a bit string or DIP data corresponding to the configuration of the DIP select switches. Upon reading the DIP data (step 924), the microcontroller stores the data in RAM (steps 925) in a manner similar to the storage of measured parameter data as previously described. Following the storage of DIP data in RAM (step 925), the microcontroller may perform tasks such as sending control data to the data concentrator 23 (FIG. 1).

Upon reaching the plurality of executable portions 922 of control program 58, the microcontroller reads the DIP data from RAM (step 926). The microcontroller performs a software decode on a first portion of the bit string of the DIP data (step 927) in order to determine the particular control device physically connected to the controller. For example, the data may determine that the microcontroller is to monitor and control an air terminal unit. After determining the connected control device, the microcontroller examines a second portion of the bit string of the DIP data (step 928) in order to perform a bit-wise comparison (step 929) with a logic statement in the first executable portion 1 (FIG. 11A). Should the second portion of the bit string match that of the logic statement, the microcontroller begins execution of the first executable portion 1 (FIG. 11A). If the second portion of the bit string does not match that of the first logic statement, the microcontroller increments its program counter to skip to the second or next executable portion of control program 922 (step 930). The microcontroller again performs a bit-wise comparison (step 929) between the second portion of the bit string and a logic statement associated with the second executable portion 2 (FIG. 11A). In this manner, the microcontroller will consecutively perform the bit-wise comparison with each executable portion until a match is detected. Upon detecting a match between the second portion of the bit string and a logic statement associated with a particular executable portion 922 (FIG. 11A), the microcontroller examines a third portion of the bit string in order to obtain data necessary for executing that executable portion (step 931). As mentioned above, the executable portion which is executed by the microcontroller instructs the microcontroller in its monitoring and control of a particular type of control device. After executing a particular executable portion, the microcontroller exits the executable portion (step 932) and continues executing control program 58.

Referring again to FIG. 1, controller 13 may be adapted to monitor and control other control devices 17 by replacing the existing EPROMs with EPROMs having a control program and set of default control parameters which are specific to that control device as for example an air terminal unit or chiller device. As mentioned above, the control program includes executable portions for fine tuning each controller 13 according to the type of a particular control device physically connected to the controller.

A pair of input connectors 539 and 540 accommodate sixteen digital inputs, which are generated by external sensing devices (not shown). Each digital input is optically coupled through 4 sets of quad optocoupler IC's 541-544, of the type PS2401. As understood, the optocouplers serve as surge protectors which prevent controller damage due to destructive voltages and currents generated by short circuits in externally controlled devices such as air baffle 316 (FIG. 3.) The optocoupler outputs drive dual 8 bit tri-state buffers 545 and 546 of the type 74LS244. Upon receiving an enable signal 548 from upper/lower byte decoder 547, the tri-state buffers place the digital input data onto data bus 561 to be read by microcontroller 519 and stored in RAM 520.

Because the 8-bit microcontroller is limited to receiving 8 bits of data at a time, the sixteen bits of digital input data must be read in two 8 bit bytes. The upper/lower byte decoder 547, of the type 74HC139, combines lower address bits A0 and A1 of address bus 558 with the output of decoder 530 to generate chip selects 548 which alternately enable the 8 bit tri-state buffers 545,546 to access data bus 561.

Based on the processing of inputs, microcontroller 519 generates sixteen digital outputs which are placed on output connectors 505 and 507 for controlling the operation of external devices such as motor 225 (FIG. 3). Digital output data generated by microcontroller 519 is placed on data bus 561 which is connected to a pair of 8 bit high current drive latches 553 and 554, of the type UCN5801. Like the sixteen digital inputs, the sixteen digital outputs generated by the microcontroller are placed on data bus 561 8 bits at a time. As understood, under the instruction of microcontroller 519, upper/lower byte decoder 547 alternately selects drive latches 553 and 554 in order to produce digital outputs on connectors 505, 507. The enable line 555 and the Read/Write line 556 from the microcontroller are combined to create a chip select enable line 557. The chip select enable line 557 and lower address line A0 of address bus 558 are used by upper/lower byte decoder 547 to generate alternate chip select signals 559 and 560 which activate drive latches 553 and 554 respectively.

Sixteen analog voltage inputs which are generated by external devices (not shown) are received by controller 13 through connectors 563 and 564. These inputs are buffered through operational amplifiers 565, 566, 567 and 568, all of the type LM324, which are connected in a voltage follower configuration. Each of the voltage follower outputs 570 are connected to a diode pair 571 for protection against voltage levels above 5.6 V and below −0.6 V. All enter a 16 channel multiplex, 10 bit analog-to-digital converter (ADC) 569 of the type HD46508. Under control of microcontroller 519, address decoder 530 generates a chip select signal 509 which, in combination with the lower address bits A0 and A1 of address bus 558, enable ADC 569 to sequentially select and convert each of the sixteen analog inputs into eight corresponding digital signals. The digital signals produced are placed on the data bus 561 to be read by the microcontroller.

Based on the processing of inputs, microcontroller 519 generates digital signals which are converted into analog outputs by two 12 bit digital-to-analog converters (DAC) 572 and 573 of the type DAC8012P. Because each DAC 572, 573 requires 12 bits of digital data in order to generate a corresponding analog signal, the upper 4 bits of a 12 bit digital word must be latched before conversion. The upper 4 bits are latched by quad D flip-flops 574 and 575, of the type 74HC75. Each latch has its own select line 578 and 579 from address decoder 530. When the upper 4 bits of the 12 bit word have been latched from data bus 561, the appropriate DAC is selected, through a combination of the device select line 580 and the lower address bit A0 of address bus 558, to receive the remaining 8 bits of the word. Depending on the state of A0, each DAC may be selected sequentially. The output of each DAC 572, 573 is converted into a proportional current of 4020 mA by respective circuits 576, 577 as described hereinafter.

A voltage 581 of the range of 0.0 (plus or minus 5.0) VDC, is outputed from the buffer amplifier 588 and used to drive a voltage-to-current conversion circuit. That circuit consists of a voltage follower 589 and current sink transistor 582, producing a current in the range of 1 to 2 milliamperes (proportional to the voltage 581) to flow through resistor (R19) 590. The combined currents, ranging from 0.5 to 2.5 milliamperes, produced a voltage potential ranging from 0.4 to 2.0 VDC across (R19) 590. Semiconductor (Q3) 585, amplifies the current flowing through R(19) 590. The ratio of (R19) 590 to (R18) 592 is a fixed ratio of 8 to 1. This produces an output current at TS9 pin 2, in the range of 4–20 mA, which may be used to drive external devices such as a variable speed motor.

Communication between controller 13 and data concentrator 23 (FIG. 1) is conducted through an RS485 serial line 435 which is connected to an RS485 transceiver IC 537 disposed on controller 13. Transceiver IC 537 communicates with microcontroller 519 in order to serially transmit or receive parameter data via parameter lines 358.

Figure 6A:
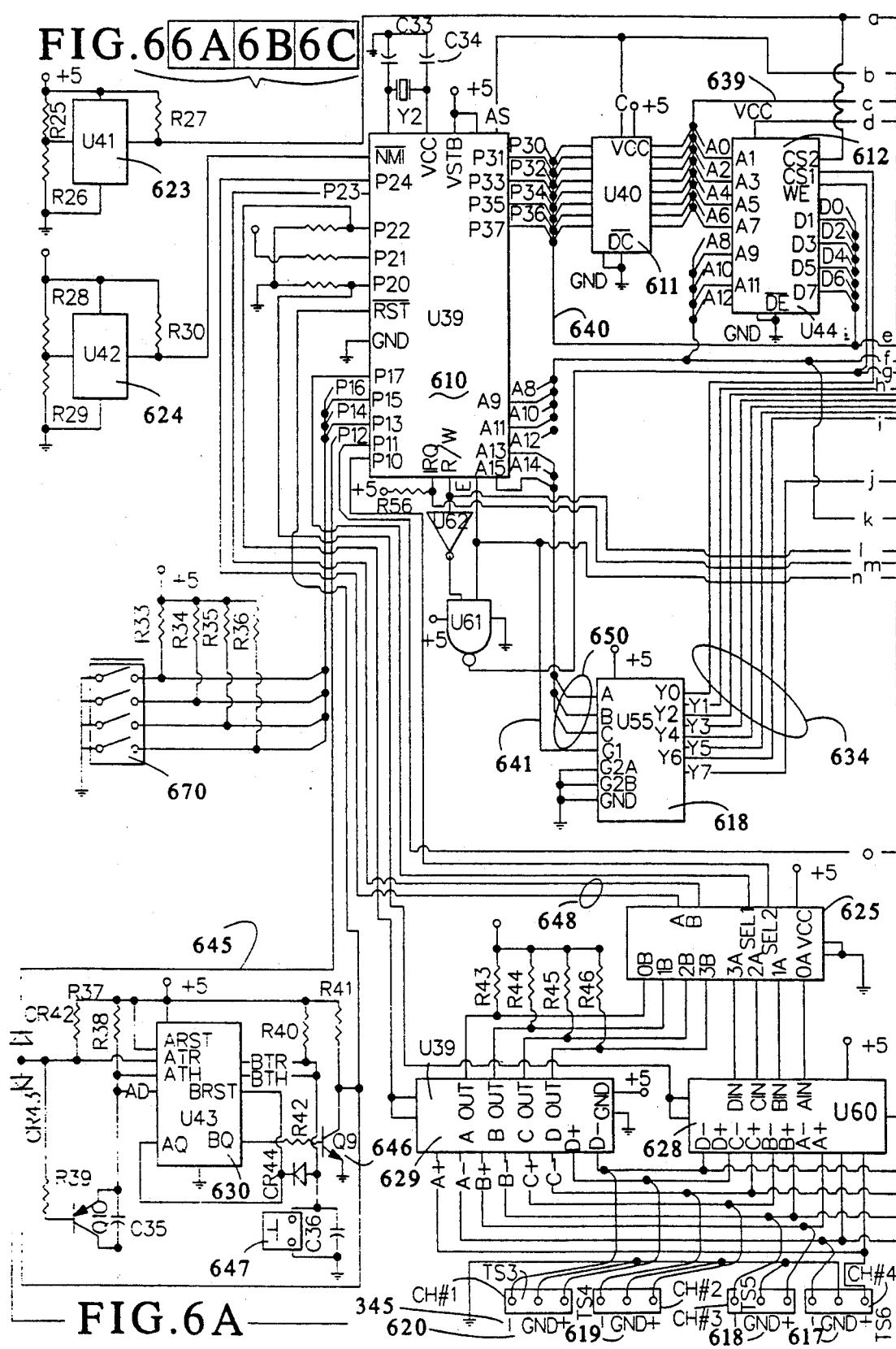
Figure 6B:
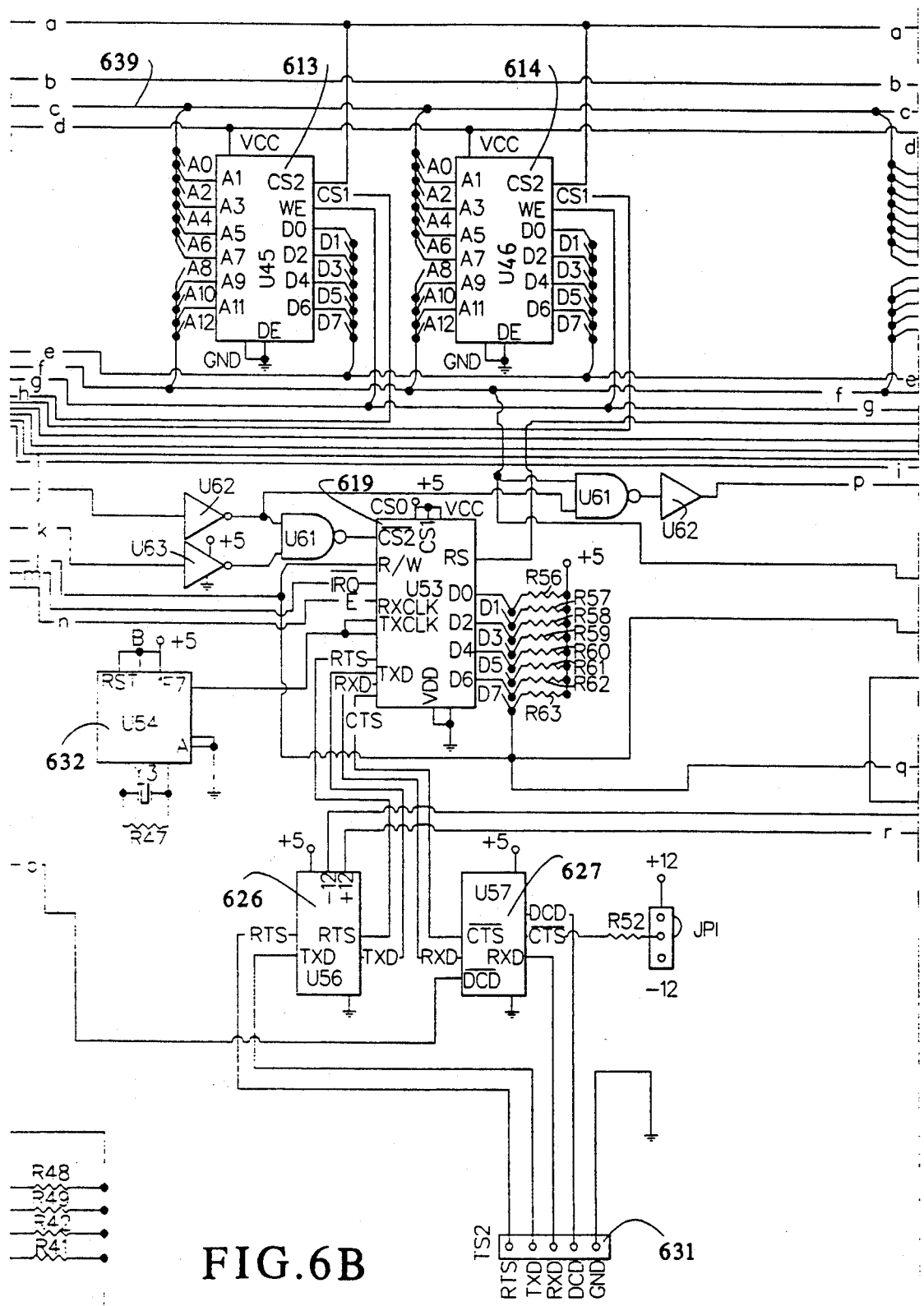
Figure 6C:
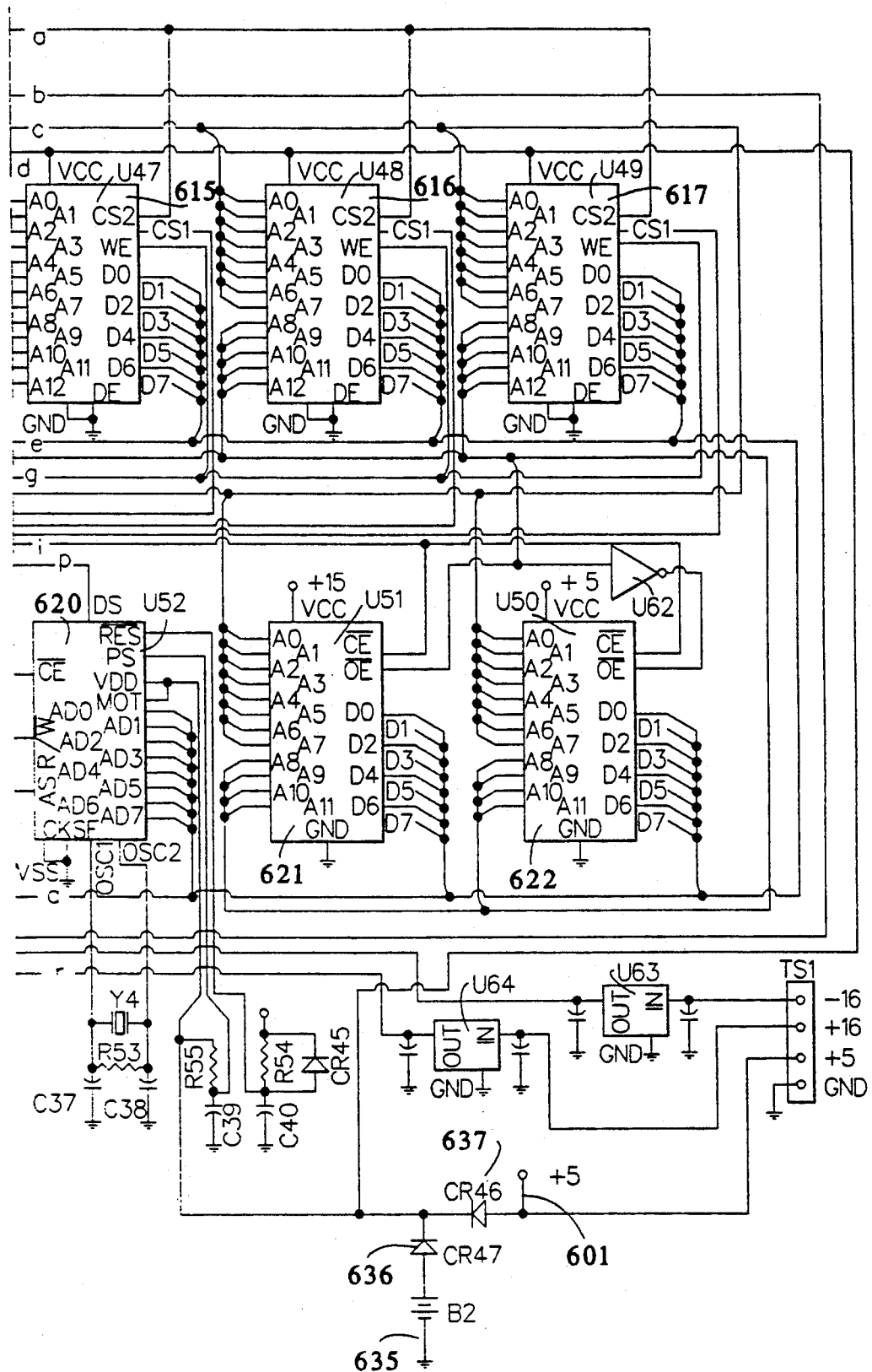

Referring to FIG. 6, the computer 411 is composed of an eight bit microcontroller 610 of the type MC6803, which operates on an interrupt basis, six 8K×8 CMOS RAM chips 612–617 of the type 5864 which are designed for low power battery backup, and two 4K×8 EPROMS 621 and 622 of type 2732A. At power-up, a control algorithm which is permanently stored in EPROMs 621 and 622 is loaded into RAM 612–617 to be executed by microcontroller 610. Following instruction provided by the control algorithm, microcontroller 610 periodically requests parameter data from each controller 13 (FIG. 1). The parameter data collected is stored in RAM 612–617. Under the instruction of the control algorithm, microcontroller 610 also directs updated control parameters entered at personal computer 25 (FIG. 1) to specific controllers 13.

The RAM 612–617 is capable of retaining data under very low power and voltage. In the event of a power failure, data stored in the RAM is protected by a backup battery 635 and rectifying diodes 636 and 637. Battery 635 is isolated from the 5 V power supply 601 by diode 636. The battery provides 3.6 V of potential, so that when the 5 V power supply is active, diode 637 is forward biased and therefore conducts current from the main power supply. Should a 5 V power supply occur, diode 637 will stop conducting, and diode 636 will become forward biased to maintain approximately 3 V on the RAM power inputs, thereby providing sufficient back-up power to enable the RAM to maintain stored data.

Power failure detectors 623 and 624 assist battery 635 in the retention of data under low power conditions. The detectors, which are of the type 8312, can be set to trigger at specific voltages by adjusting the resistance ratio at pin 3. In the event that the supply voltage drops below the set trigger voltage, the voltage detector 624 generates an interrupt signal which warns the microcontroller 610 of a drop in supply voltage so that the microcontroller may store the data in its registers in RAM before going inactive. Likewise, power fail detector 623 generates a signal to disable the RAM under low power conditions. As understood, a delay exits between the detection of power failure and the disablement of RAM 612–617 thereby providing sufficient time for microcontroller 610 to store the data in its registers in RAM before a loss of power.

The computer 411 also includes a dual RC timer 630 of the type LM 556 which functions as a missing pulse detector When subjected to interference such as a power glitch, the microcontroller may lose its stack-pointer. In order to prevent this occurrence, a prescribed pulse output appearing on line 645 has been programmed into the microcontroller code. In the event that the pulse is missing due to interference, the missing pulse detector generates a signal which resets the microcontroller 610 through a transistor 646. A pushbutton 647 is incorporated into the missing pulse detector to accomplish a manual reset function. As understood, upon being reset, the microcontroller 610 outputs addresses in order to read the control program permanently stored in the EPROMS 621 and 622.

Parameter data corresponding to the operation of each controller 13 (FIG. 1) is communicated to and from the data concentrator 23 via serial line 345. As shown in FIG. 6, data concentrator 23 includes 4 channels 617, 618, 619 and 620 each capable of serially communicating with up to 30 controllers (FIG. 1). As understood, in applications requiring more than 120 controllers, a second data concentrator (not shown) may be connected to one of the 4 channels 617, 618, 619, or 620 for serially communicating with up to 120 additional controllers.

In a system comprising multiple data concentrators, the DIP switches 670 may be configured to assign a unique board address to each data concentrator. The microcontroller 610 directly reads the data associated with the configuration of DIP switches 670.

In accordance with the present invention, microcontroller 610 periodically generates addressed data requests for sequentially obtaining parameter data from each controller 13 (FIG. 1). A data request is serially placed on line 648 which is connected to a dual 1 of 4 input multiplexer 625. Based on the address associated with the data request, multiplexer 625, in cooperation with an RS 485 output driver 629, sequentially places the data request on the channels 617, 618, 619 and 620. Each controller (FIG. 1) connected to the channel carrying the data request compares its board address to that specified within the data request. The controller having the specified board address serially transmits its parameter data to microcontroller 610 via an RS485 input driver 628 and multiplexer 625. The microcontroller 610 places the parameter data onto a data bus 640 and generates the appropriate signals to store the parameter data in RAM 612–617. As understood, addressed data requests are periodically generating by microcontroller 610 for obtaining the latest parameter data associated with each controller. Upon receiving the latest parameter data, microcontroller 610 overwrites the parameter data obtained from the previous data request thereby conserving the storage space available in RAM 612-617.

The microcontroller uses an address latch 611, typically of the type 74HC373, to sort address information and parameter data. The address strobe of the microcontroller triggers address latch 611 only when address information is present at ports P30-P37 which act as inputs to the address latch. The address latch 611 in cooperation with the address bus (A0-A7) 639 carries address information between microcontroller 610, RAM 612-617, EPROMS 621, 622, and Universal Asynchronous Receiver Transmitter (UART) 119 of the type 6850.

The physical address of each RAM chip 612-617 is present on address lines (A8-A12) 219. Microcontroller 610 uses the physical addresses to generate data on the upper three bits (A13-A15) of address bus 650. A decoder 618, of the type 74HC138, decodes the data present on bus 650 in order to generate chip selects on lines 634 which are tied to each RAM chip 612-617.

Data bus 640 which is connected to microcontroller ports P30-P37 links the microcontroller 610 to RAM 612-617 and UART 619 for carrying parameter data therebetween. In addition, the data bus 640 carries address information when address information is present at ports P30-P37. As understood parameter data which is present on the data bus 640 is written to or read from RAM only when one of the chip select lines 634 is active. In order for the chip selects 634 to coincide correctly with the parameter data on the data bus 640, they must be synchronized with the E clock 641 of the microcontroller 610.

The latest parameter data stored in RAM 612-617 may be accessed by personal computer 25 (FIG. 1) which communicates with data concentrator 23 through an RS232 serial line 631. Under instruction provided by an operator, personal computer 25 generates an addressed information inquiry for obtaining the latest controller specific parameter data residing in RAM 612-617 of data concentrator 23. The information inquiry is serially transmitted by personal computer 25 to the UART 619 via the serial line 631. Upon receiving an information inquiry, UART 619 generates an interrupt request which instructs microcontroller 610 to stop collecting parameter data from the controllers 13 (FIG. 1) and begin transmission of the latest parameter data stored in RAM 612-617. The UART 619 is pulsed by an external baud rate generator 632 for serially clocking the requested parameter data out of RAM 612-617. A pair of EIA drive chips 626 and 627 of the type 1488 and 1489 convert 5 V data signals corresponding to the parameter data into 12 V signals which are transmitted to personal computer 25 via serial line 631.

In a similar manner, data concentrator 23 directs control parameter updates which are generated by personal computer 25 (FIG. 1) to controllers specified within the updates. Upon receiving a control parameter update via serial line 631, UART 619 generates signal telling microcontroller 610 to begin execution of a data receive routine. Executing the data receive routine, the microcontroller 610 generates control signals instructing UART 619 to serially transmit the control parameter update to RAM 612-617. As soon as the entire update has been stored in RAM, the microcontroller serially transmits the control parameter update to multiplexer 625 via line 648. The control parameter update is sequentially placed onto the channels 617, 618, 619, and 620 by output driven chip 629 for transmission to a specific controller 13 designated within the update.

As illustrated, data concentrator 23 includes a real time clock (RTC) 620 of the type 6818 which is connected in parallel to microcontroller 610. In the event that real time clock 341 (FIG. 3) fails due to battery failure, RTC 620 will generate real time data which brings the failed clock into synchronization with the rest of the system when the battery is replaced.

In accordance with the present invention, data concentrator 23 functions independently of personal computer 25 to access and store the latest parameter data associated with each controller 13 (FIG. 1). Personal computer 25 serves only as a window into data concentrator 23 for permitting an operator to view the latest parameter data associated with each controller in the system 11. If desired, personal computer 25 may be used to perform other tasks such as word processing, accounting, or general programming.

In accordance with the preferred mode of the present invention, personal computer 25 executes software which permits the personal computer to periodically sample and store the parameter data stored in RAM 612-617 of data concentrator 23. The personal computer 25 includes a real time clock (now shown) which associates a date and time with each sample of parameter data stored for providing a historical record of events. As understood, in the preferred mode, personal computer may be used to perform various tasks while sampling and storing parameter data from data concentrator 23.

If desired, a modem may be connected to the data concentrator for transmitting data via a phone time or radio transmitter. This is particularly the case for an alarm such as that associated with TEMP Alarm 821 to be communicated in an immediate fashion to maintenance personnel.

| APPENDIX | | |
|---|---|---|
| Reference | No. Description | Designation |
| DATA CONCENTRATOR | | |
| INTEGRATED CIRCUIT | MC6803U4 | U39 |
| INTEGRATED CIRCUIT | T4HCT373 | U40 |
| INTEGRATED CIRCUIT | 1CL8211 | U41, 42 |
| INTEGRATED CIRCUIT | LM556 | U43 |
| RAM | HM6264LP-14 | U44-49 |
| PROM | 2732A-30 | U50, 51 |
| INTEGRATED CIRCUIT | MC146818 | U52 |
| INTEGRATED CIRCUIT | MC6850 | U53 |
| INTEGRATED CIRCUIT | MC14411 | U54 |
| INTEGRATED CIRCUIT | 74HCT138 | U55 |
| INTEGRATED CIRCUIT | MC1488 | U56 |
| INTEGRATED CIRCUIT | MC1489 | U57 |
| INTEGRATED CIRCUIT | CD4052 | U58 |
| INTEGRATED CIRCUIT | MC3486 | U59 |
| INTEGRATED CIRCUIT | MC3487 | U60 |
| INTEGRATED CIRCUIT | 74HCT00 | U61 |
| INTEGRATED CIRCUIT | 74HCT04 | U62 |
| V.R. | 79L12 | U63 |
| V.R. | 78L12 | U64 |
| TRANSISTOR | 2N2222 | Q9 |
| TRANSISTOR | 2N3906 | Q10 |
| DIODE | 1N4148 | CR41, 42-47 |
| CAPACITOR | 17pF, 50 V | C1, 2, 5, 6 |
| CAPACITOR, TANT. | 4.7 uF, 6 V | C3 |
| CAPACITOR, TANT. | 1 uF, 16 V | C4, 10, 12 |
| CAPACITOR, CERAMIC | .1u, 50 v | C7-9, 11, 13-36 |
| RESISTOR, MF, 1%, .25 W | 32.4K | R25 |

-continued

APPENDIX

| Reference | No. Description | Designation |
|---|---|---|
| RESISTOR, MF, 1%, .25 W | 11.5K | R26 |
| RESISTOR, CF, 5%, .25 W | 10K | R27, 30-37, 42, 44-47 |
| | | R49-53, 57 |
| RESISTOR, MF, 1%, .25 W | 22.6K | R28 |
| RESISTOR, CF, 5%, .25 W | 4.7K | R38 |
| RESISTOR, CF, 5%, .25 W | 2.2M | R39 |
| RESISTOR, CF, 5%, .25 W | 1K | R40, 43, 55 |
| RESISTOR, CF, 5%, .25 W | 240K | R31 |
| RESISTOR, CF, 5%, .25 W | 15K | R48 |
| RESISTOR, CF, 5%, .25 W | 10K | R54 |
| RESISTOR, CF, 5%, .25 W | 2.2K | R56 |
| CRYSTAL | 4.9152 MHz | Y2 |
| CRYSTAL | 1.8432 MHz | Y3 |
| CRYSTAL | 32.768 KHz | Y4 |

CONTROLLER

| | | |
|---|---|---|
| MICRO.PROCESSOR | MC6803U4 | U1 |
| INTEGRATED CIRCUIT | 74HCT373 | U2 |
| INTEGRATED CIRCUIT | CXK5864P-15 | U3 |
| INTEGRATED CIRCUIT | 2732 | U4, U5 |
| INTEGRATED CIRCUIT | 1CL8211 | U6, U14 |
| INTEGRATED CIRCUIT | SN75176AP | U7 |
| TIMER CHIP | LM556N | U8 |
| INTEGRATED CIRCUIT | 74HCT75 | U9, U11 |
| DAC CHIP | DAC8012P | U10, U12 |
| ADC CHIP | HD46508A | U13 |
| INTEGRATED CIRCUIT | 74HCT139 | U15 |
| INTEGRATED CIRCUIT | UCN4801A | U16, U17 |
| INTEGRATED CIRCUIT | 74HCT244 | U18-21 |
| CHIP, OPTO | PS2401A-4 | U22-25 |
| INTEGRATED CIRCUIT | 74HCT138 | U32 |
| INTEGRATED CIRCUIT | 74HCT04 | U32, U35 |
| INTEGRATED CIRCUIT | 74HCT00 | U34 |
| OP-AMP | LM324 | U26-31 |
| OP-AMP | LM358 | U39 |
| CHIP, VR | 79M12 | U36 |
| CHIP, VR | 78M12 | U37 |
| CHIP, VR | REF-02 | U38 |
| TRANSISTOR | 2N3906 | Q1 |
| TRANSISTOR | 2N2222 | Q2, Q5-8 |
| TRANSISTOR | MPSA63 | Q3, Q4 |
| DIODE | 1N4148 | CR1-CR41 |
| CRYSTAL | 4.9152 MHZ | Y1 |
| RESISTOR, MF, .25 W, 1% | 32.4K | R1 |
| RESISTOR, MF, .25 W, 1% | 11.5K | R2, R25 |
| RESISTOR, CF, .25 W, 5% | 10K | R3-6, 23, 10 |
| RESISTOR, CF, .25 W, 5% | 4.7K | R7 |
| RESISTOR, CF, .25 W, 5% | 2.2M | R8 |
| RESISTOR, CF, .25 W, 5% | 240K | R9 |
| RESISTOR, CF, .25 W, 5% | 1K | R11-R12 |
| RESISTOR, MF, .25 W, 1% | 10.0K | R13, 14, 17, 22 |
| RESISTOR, MF, .25 W, 1% | 100 | R18, R21 |
| RESISTOR, MF, .25 W, 1% | 806 | R19, R20 |
| RESISTOR, MF, .25 W, 1% | 22.6K | R24 |
| POTENTIOMETER | 5K, 20T, .375" | R15-R16 |
| SIP RES. NET. | 10K*9, 2% | RP1-2, 4, 5 |
| SIP RES. NET. | 470*9, 2% | RP3, RP6 |
| SIP RES. NET. | 4.7K*9, 2% | RP7 |
| SIP RES. NET. | 1M*9, 2% | RP8, RP9 |
| CAPACITOR, MICA | 30 pF | C1, 2 |
| CAPACITOR, TANT. | 4.7 uF, 6 V | C3 |
| CAPACITOR, TANT. | 1.0 uF, 16 V | C4, C6, C8 |
| CAPACITOR, ELEC. | 100 uF, 25 V, R. | C5, C7 |
| CAPACITOR, CERAMIC | .1 uF | C9-C32 |

What is claimed is:

1. A reconfigurable environmental controller for independently monitoring and controlling a sensed physical parameter for maintaining environmental conditions in accordance with control parameter data, comprising:

i. an environmental condition sensing device for sensing a physical parameter representing an environmental condition and for generating signals indicative of said sensed environmental condition;

ii. a controlled device for generating an output to adjust said sensed physical parameter and said environmental condition represented thereby;

iii. data processing means coupled to said controlled device for controlling said controlled device and coupled to said sensing device to receive said signals and convert said signals into sensed parameter data, said data processing means performing a comparison between said sensed parameter data and said control parameter data for generating output signals controlling said controlled device in response to said comparison for minimizing the difference between said sensed parameter data and said control parameter data;

iv. control software having a plurality of executable portions associated with a plurality of different types of controlled devices, each of said executable portions providing operative instruction to said data processing means for monitoring and controlling a specific type of said plurality of controlled devices; and v. manually configurable switching means read by said data processing means for identifying at least one executable portion of said control software to be executed by said data processing means, said switching means enabling said data processing means to execute said executable portion of control software associated with the controlled device coupled to said environmental controller and said switching means being manually reconfigurable to identify at least one different executable portion of said control software associated with a different type of controlled device to allow said different type of controlled device to be coupled to and controlled by said environmental controller to replace said coupled controlled device without the need for altering said control software.

2. An environmental controller according to claim 1 wherein said control parameter data further includes a set of time-on/time-off limits for specifying to said data processing means time intervals during which said environmental conditions are to be maintained by said environmental controller.

3. An environmental controller according to claim 2 wherein said environmental controller includes timing means for generating real time data, said real time data being monitored by said data processing means for maintaining said environmental conditions during said time intervals.

4. An environmental controller according to claim 3, wherein said timing means includes a real time clock.

5. An environmental controller according to claim 1 further including a data storage means for storing a default set of control parameter data.

6. An environmental controller according to claim 5 wherein said default set includes temperature set points for specifying to said data processing means a temperature to be maintained.

7. An environmental controller according to claim 5 wherein said default set further includes temperature set back values for specifying to said data processing means a temperature to be maintained during non-specified time intervals.

8. An environmental controller according to claim 5 wherein said default set further includes a high temperature alarm limit and low temperature alarm limit for specifying to said data processing means the uppermost and lower most allowable environmental temperatures, said data processing means generating an alarm signal when said high temperature alarm limit or said low temperature alarm limit has been exceeded.

9. An environmental controller according to claim 1 further including data storage means for storing said sensed parameter data, said controlled parameter data and a default set of control parameter data; and communication interface means associated with said data processing means for accessing said data from said data storage means, said communication interface means receiving new control parameter data from said peripheral device and transmitting said new control parameter data to said data storage means to update said control parameter data wherein said default set of control parameter data may be overridden by said new control parameter data.

10. An environmental controller according to claim 9 wherein said data storage means includes a Random Access Memory for storing said sensed parameter data and said control parameter data.

11. An environmental controller according to claim 10 wherein said Random Access Memory is battery protected for remaining active under a condition of power failure.

12. An environmental controller according to claim 9 wherein said data storage means includes an Erasable Programmable Read only Memory for storing said default set and said control software.

13. An environmental controller according to claim 12 wherein said Erasable Programmable Read Only Memory is changeable for providing said data processing means with alternate control software and an alternate default set.

14. An environmental controller according to claim 1 wherein said data processing means includes a microcontroller.

15. An environmental controller according to claim 14 wherein said data processing means further includes analog to digital conversion means for converting analog signals into digital signals to be processed by said microcontroller.

16. An environmental controller according to claim 14 wherein said data processing means further includes digital to analog conversion means for converting digital signals into analog signals.

17. An environmental controller according to claim 14 wherein said data processing means further includes power fail detection means.

18. An environmental controller according to claim 14 wherein said data processing means further includes fault detection means for resetting said microcontroller when said microcontroller is subjected to external interference.

19. An environmental controller according to claim 9 wherein said communication interface means includes a serial transceiver communicating with said data processing means for accessing said sensed parameter data and said control parameter data from said data storage means, said serial transceiver communicating with said data processing means for placing said updated control parameter data into said data storage means.

20. An environmental controller according to claim 1 wherein said manually configurable switching means includes DIP select switches.

21. An environmental controller according to claim 1 wherein said controlled device includes at least one sensor coupled to said data processing means for generating output data related to said output generated by said controlled device.

* * * * *